US012756795B2

(12) United States Patent
Feng et al.

(10) Patent No.: US 12,756,795 B2
(45) Date of Patent: Oct. 6, 2026

(54) CALIBRATING A PHYSICAL SPACE FOR MULTI-CAMERA VIDEO STREAM SELECTION FOR IN-PERSON CONFERENCE PARTICIPANTS

(71) Applicant: Zoom Communications, Inc., San Jose, CA (US)

(72) Inventors: Juntao Feng, Hangzhou (CN); Huaijia Lin, Singapore (SG); Bo Ling, Saratoga, CA (US); Chong Lv, Hangzhou (CN); Shuo Yang, Hangzhou (CN); Huixi Zhao, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 205 days.

(21) Appl. No.: 18/651,205

(22) Filed: Apr. 30, 2024

(65) Prior Publication Data

US 2025/0337860 A1 Oct. 30, 2025

(51) Int. Cl.

| | |
|---|---|
| ***H04N 7/15*** | (2006.01) |
| ***G06T 7/80*** | (2017.01) |
| ***G06V 10/25*** | (2022.01) |
| ***G06V 10/74*** | (2022.01) |

(52) U.S. Cl.

CPC ............... *H04N 7/152* (2013.01); *G06T 7/80* (2017.01); *G06V 10/25* (2022.01); *G06V 10/761* (2022.01)

(58) Field of Classification Search

CPC . H04N 7/152; G06T 7/80; G06T 2207/30196; G06T 7/292; G06V 10/25; G06V 10/761

See application file for complete search history.

(56) References Cited

U.S. PATENT DOCUMENTS

| | | | | |
|---|---|---|---|---|
| 9,779,296 | B1 * | 10/2017 | Ma | G06V 10/462 |
| 2016/0188109 | A1 * | 6/2016 | Wang | G06F 3/0418 345/173 |
| 2018/0341818 | A1 * | 11/2018 | Steffanson | G08B 13/19 |
| 2022/0284600 | A1 * | 9/2022 | Brigden | G06T 7/85 |

(Continued)

FOREIGN PATENT DOCUMENTS

| | | | |
|---|---|---|---|
| EP | 2309451 | B1 | 1/2013 |
| JP | 2011086111 | A | 4/2011 |

(Continued)

OTHER PUBLICATIONS

International Search Report and Written Opinion mailed on Aug. 26, 2025 in corresponding PCT Application No. PCT/US2025/026835.

(Continued)

*Primary Examiner* — Stella L. Woo

(74) *Attorney, Agent, or Firm* — Young Basile Hanlon & MacFarlane, P.C.

(57) ABSTRACT

Matched points are identified using at least a first camera and a second camera as a person moves within a physical space during a calibration of the physical space. The matched points may be identified between each pair of cameras. A physical space calibration matrix that is solved based on the matched points is used during a video conference to determine whether a first bounding box of a first person captured by the first camera and a second bounding box of a second person captured by the second camera identify a single conference participant within the physical space.

20 Claims, 10 Drawing Sheets

(56) References Cited

U.S. PATENT DOCUMENTS

| | | | | |
|---|---|---|---|---|
| 2022/0383522 | A1 | 12/2022 | Lai et al. | |
| 2023/0401891 | A1* | 12/2023 | Nguyen | G06V 40/161 |
| 2024/0257553 | A1* | 8/2024 | Hafstad | G10L 17/00 |
| 2025/0139968 | A1* | 5/2025 | Bhatt | H04N 23/80 |
| 2025/0307986 | A1* | 10/2025 | Harpavat | G06T 3/4053 |

FOREIGN PATENT DOCUMENTS

| | | | |
|---|---|---|---|
| WO | 2022127918 | A1 | 6/2022 |
| WO | 2024068243 | A1 | 4/2024 |

OTHER PUBLICATIONS

You Sisi et al: "Multi. Target Multi-Camera Tracking With Optical-Based Pose Association", IEEE Transactions on Circuits and Systems for Video Technology, IEEE, USA, vol. 31, No. 8, Nov. 6, 2020 (Nov. 6, 2020), pp. 3105-3117, XP011870058, ISSN: 1051-8215, DOI:10.1109/TCSVT.2020.3036467 [retrieved on Aug. 2, 2021] abstract, figures 3,4.

* cited by examiner

CALIBRATING A PHYSICAL SPACE FOR MULTI-CAMERA VIDEO STREAM SELECTION FOR IN-PERSON CONFERENCE PARTICIPANTS

FIELD

This disclosure generally relates to multi-camera video stream selection for in-person video conference participants, and, more specifically, to performing a calibration for a conference room using epipolar geometry to aid in determining which video stream to use for each conference participant.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
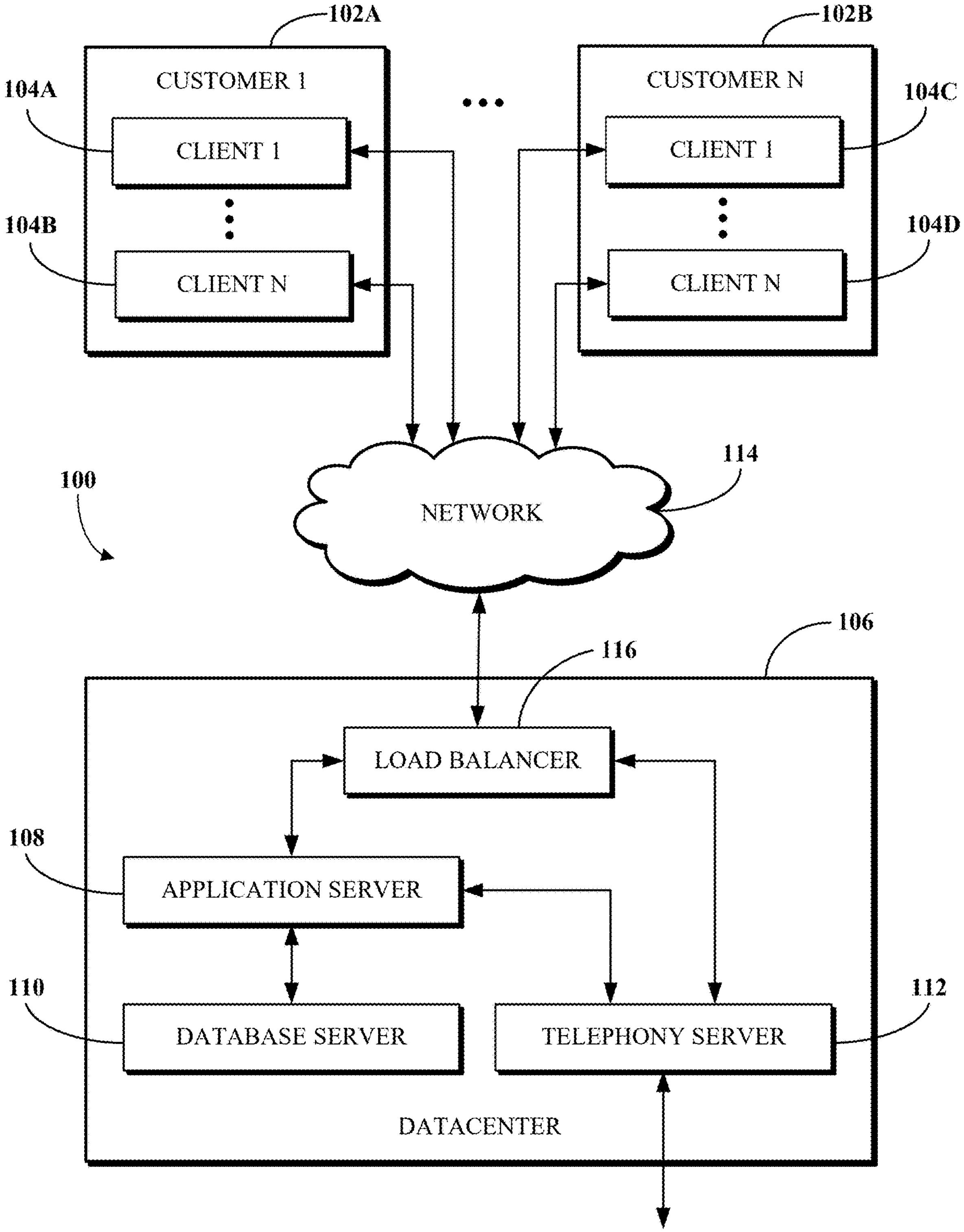
FIG. 1 is a block diagram of an example of an electronic computing and communications system.

Conferencing software is frequently used across various industries to support conferences between participants in multiple locations. In many cases, one or more of the conference participants is physically located in and connects to the conferencing software from a conference room (e.g., in an office setting), and other conference participants connect to the conferencing software from one or more remote locations. Conferencing software thus enables people to conduct conferences without requiring them to be physically present with one another. Conferencing software may be available as a standalone software product or it may be integrated within a software platform, such as a unified communications as a service (UCaaS) platform.

In many cases, conferencing software uses video media to output, in real-time, video streams captured from endpoints connected to the conferencing software. For people physically present within a physical space, such as a conference room, a computing device within the physical space serves as the endpoint. Typically, there is a single camera within a conference room, which is usually located in a central position on one side of the conference room so as to capture most or all of the conference room within a field of view thereof, and there may be one or more microphones throughout the conference room to capture sound from persons present in the conference room. These media capture devices are typically connected to the computing device within the conference room, which transmits streams thereof to a server that implements the conferencing software. The conferencing software then renders an output video stream based on the video feed from the camera within a user interface of the conferencing software (e.g., within a user interface tile associated with the conference room) and introduces an audio feed from the one or more microphones within an audio channel of the conference.

A user interface of conventional conferencing software includes a number of user interface tiles in which video feeds received from the various connected devices are separately rendered. Conference participants remotely connecting to conventional conferencing software are represented within a user interface of the conferencing software using individualized user interface tiles based on the video feeds received from their devices. In contrast, because a single video feed is received from the camera within a conference room, conference participants who are physically located within the conference room generally are all represented within the same user interface tile. However, the use of a single user interface tile to show all participants within a conference room may limit the contribution that those participants have to the overall conference experience over the conferencing software. For example, a conference participant located somewhere in the conference room will not be given the same amount of focus within the user interface of the conferencing software, which includes all of the user interface tiles, as someone who is front and center within their own individualized user interface tile. In another example, conversations between participants within the conference room may be missed or misattributed to others by remote participants who are not present in the conference room.

One solution uses a system for processing a video stream received from a camera within a physical space, such as a conference room, to identify multiple people within that video stream. The system may perform object detection looking for humans within input video streams and determine one or more regions of interest within the conference room as the output of that object detection. Each region of interest generally corresponds to one person. The system then separates each person, based on their region of interest, into their own dedicated user interface tile and causes video data for those people to be rendered within their respective user interface tiles within the conferencing software user interface. Individually representing each participant within the conference room has certain benefits, including enabling better communications between remote participants and individual participants within the conference room and enabling better visibility of those participants within the conference room for remote participants.

When this solution uses multiple cameras from within the physical space, a given person within the physical space may be identified by more than one of the cameras. In such a case, and unless the cameras which have fields of view including the given person are next to one another, the video stream obtained from one of the cameras is likely to represent the person better than the video stream obtained from the other camera or cameras. One of those video streams obtained from the multiple cameras, then, may be selected for the person based on one or more factors.

However, physical spaces with multiple cameras may run into difficulties differentiating between conference participants within the physical space. For example, conference participants may be wearing similar clothes, have similar face structures, and have similar hairstyles. Given that typical recognition engines use only so many parameters to operate (e.g., to identify separate participants), these participant similarities may be challenging for a recognition engine. Thus, using object detection or face recognition alone, existing participant detection approaches used by conventional conferencing software may be prone to common error, for example, by selecting a video stream for a given conference participant despite the conference participant not actually being depicted in that video stream. In many cases, this erroneous processing can result in disruption to the conference experience, particularly where one or more participants do not know the participant who is erroneously misrepresented, potentially also causing confusion and embarrassment.

Implementations of this disclosure address problems such as these by performing a physical space calibration of the physical space prior to the start of a video conference. The physical space calibration uses epipolar geometry to verify that a person identified across two cameras is the same person, particularly when multiple people within the physical space share similar identity attributes. Calibration software used for video conferencing can determine whether a person identified by a first camera is the same as a person identified by a second camera. The conferencing software can then select, from among the available video streams, a video stream to output for rendering within a user interface tile of the video conference graphical user interface (GUI) for each conference participant.

Figure 9:
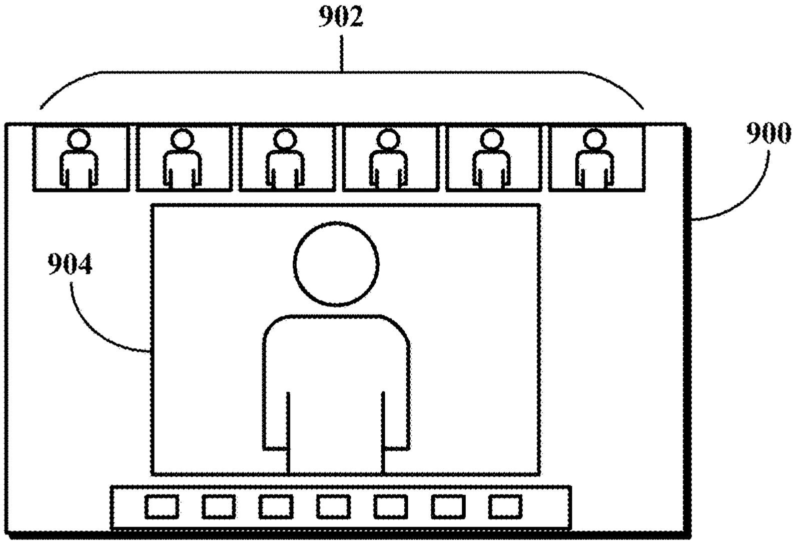
FIG. 9 is an illustration of a user interface of conferencing software within which video streams determined for conference participants in a physical space that has been through physical space calibration are rendered within user interface tiles.

As used herein, a "user interface tile" refers to a portion of a conferencing software user interface which displays a rendered video showing one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface. Examples of user interface tiles are shown in FIG. 9.

In some examples of the present disclosure, implementations may include or otherwise use one or more artificial intelligence or machine learning (collectively, AI/ML) systems having one or more models trained for one or more purposes. Use or inclusion of such AI/ML systems, such as for implementation of certain features or functions, may be turned off by default, where a user, an organization, or both must opt-in to utilize the features or functions that include or otherwise use an AI/ML system. User or organizational consent to use the AI/ML systems or features may be provided in one or more ways, for example, as explicit permission granted by a user prior to using an AI/ML feature, as administrative consent configured by administrator settings, or both. Users for whom such consent is obtained can be notified that they will be interacting with one or more AI/ML systems or features, for example, by an electronic message (e.g., delivered via a chat or email service or presented within a client application or webpage) or by an on-screen prompt, which can be applied on a per-interaction basis. Those users can also be provided with an easy way to withdraw their user consent, for example, using a form or like element provided within a client application, webpage, or on-screen prompt to allow individual users to opt-out of use of the AI/ML systems or features.

To enhance privacy and safety, as well as provide other benefits, the AI/ML processing system may be prevented from using a user's or organization's personal information (e.g., audio, video, chat, screen-sharing, attachments, or other communications-like content (such as poll results, whiteboards, or reactions)) to train any AI/ML models and instead only use the personal information for inference operations of the AI/ML processing system. Instead of using the personal information to train AI/ML models, AI/ML models may be trained using one or more commercially licensed data sets that do not contain the personal information of the user or organization.

To describe some implementations in greater detail, reference is first made to examples of hardware and software structures used to implement a system for calibrating a physical space for multi-camera video stream selection for in-person video conference participants. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
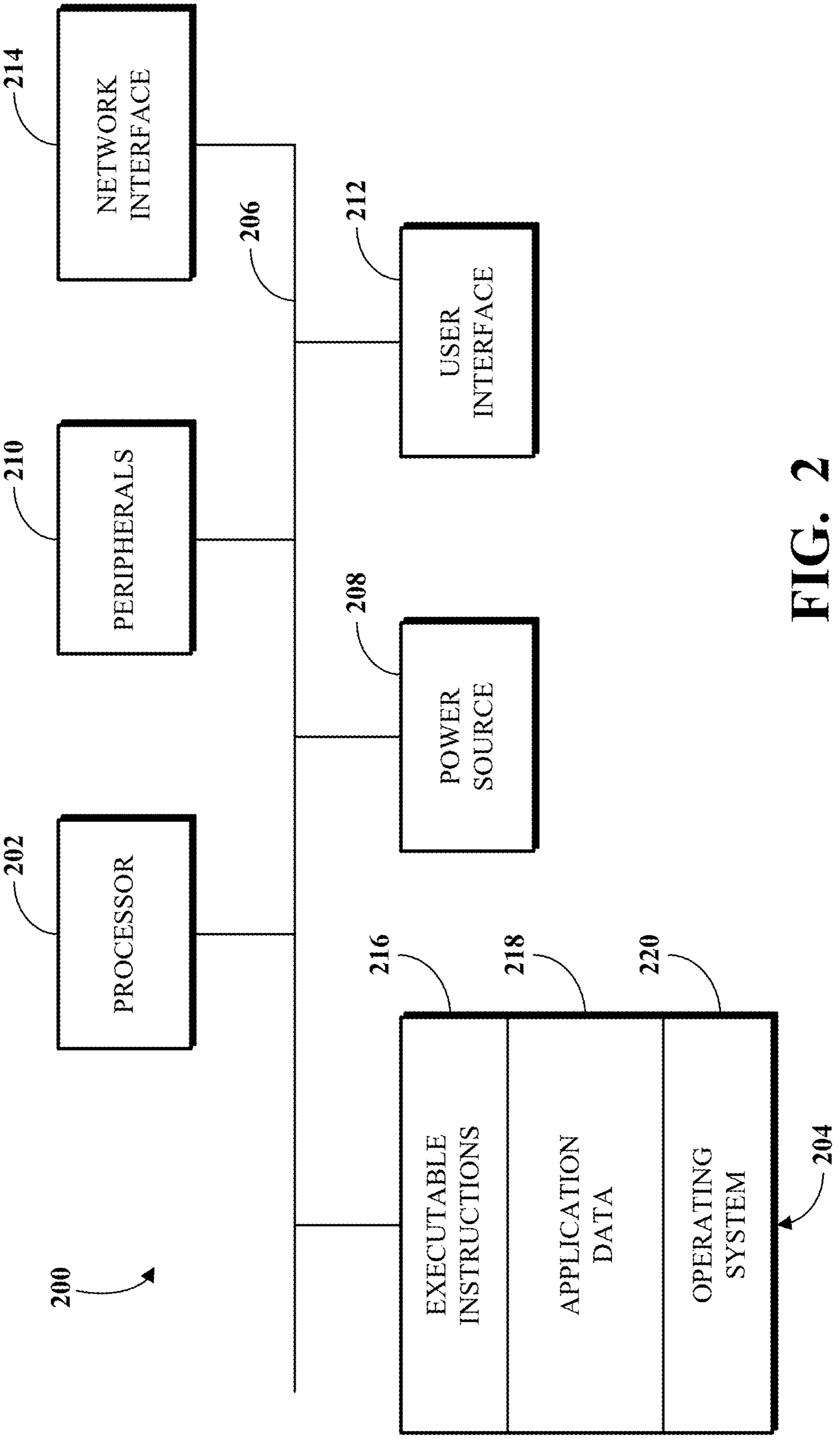
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
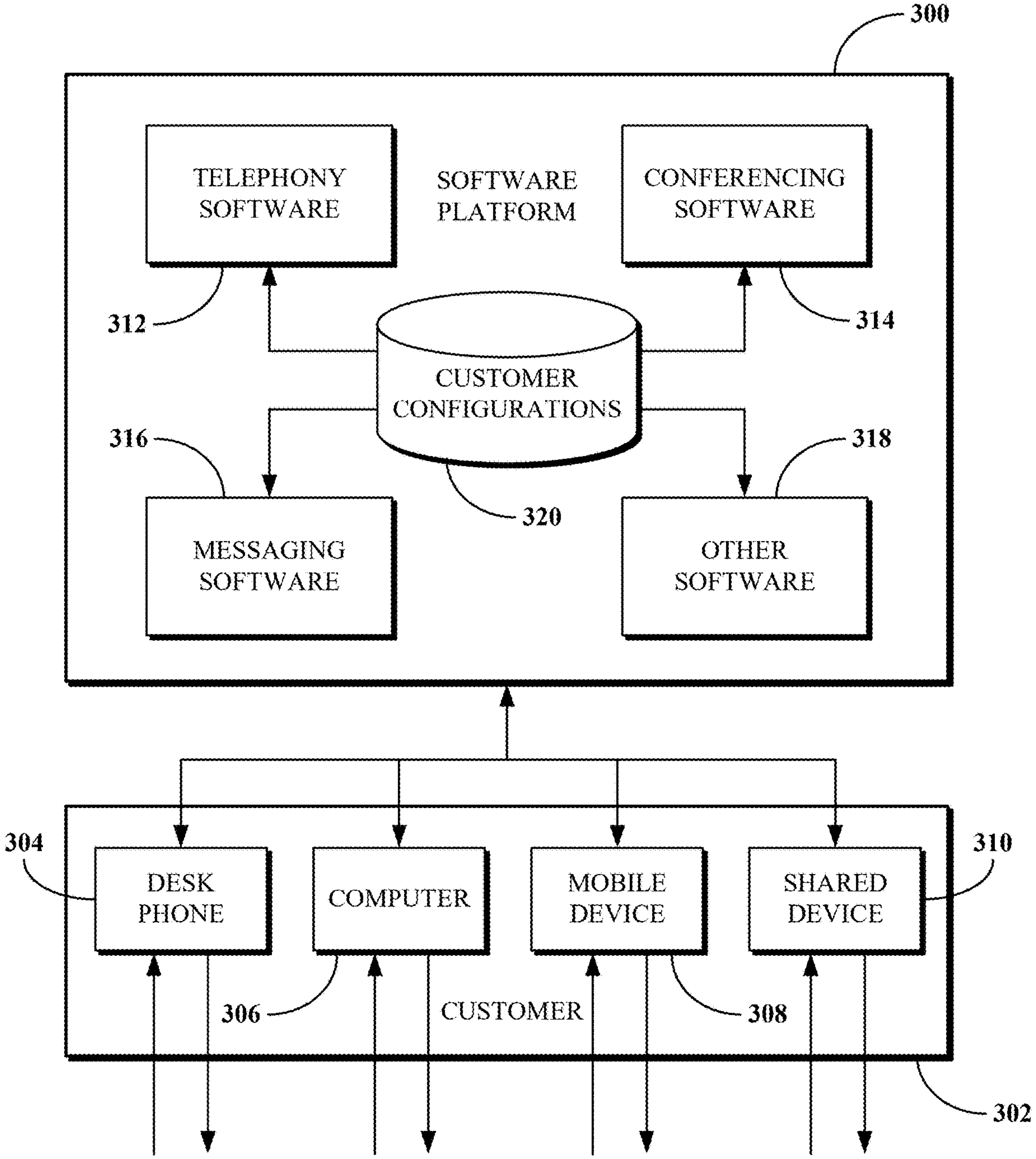
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for using, during a video conference, a physical space calibration matrix to assist in differentiating between conference participants.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
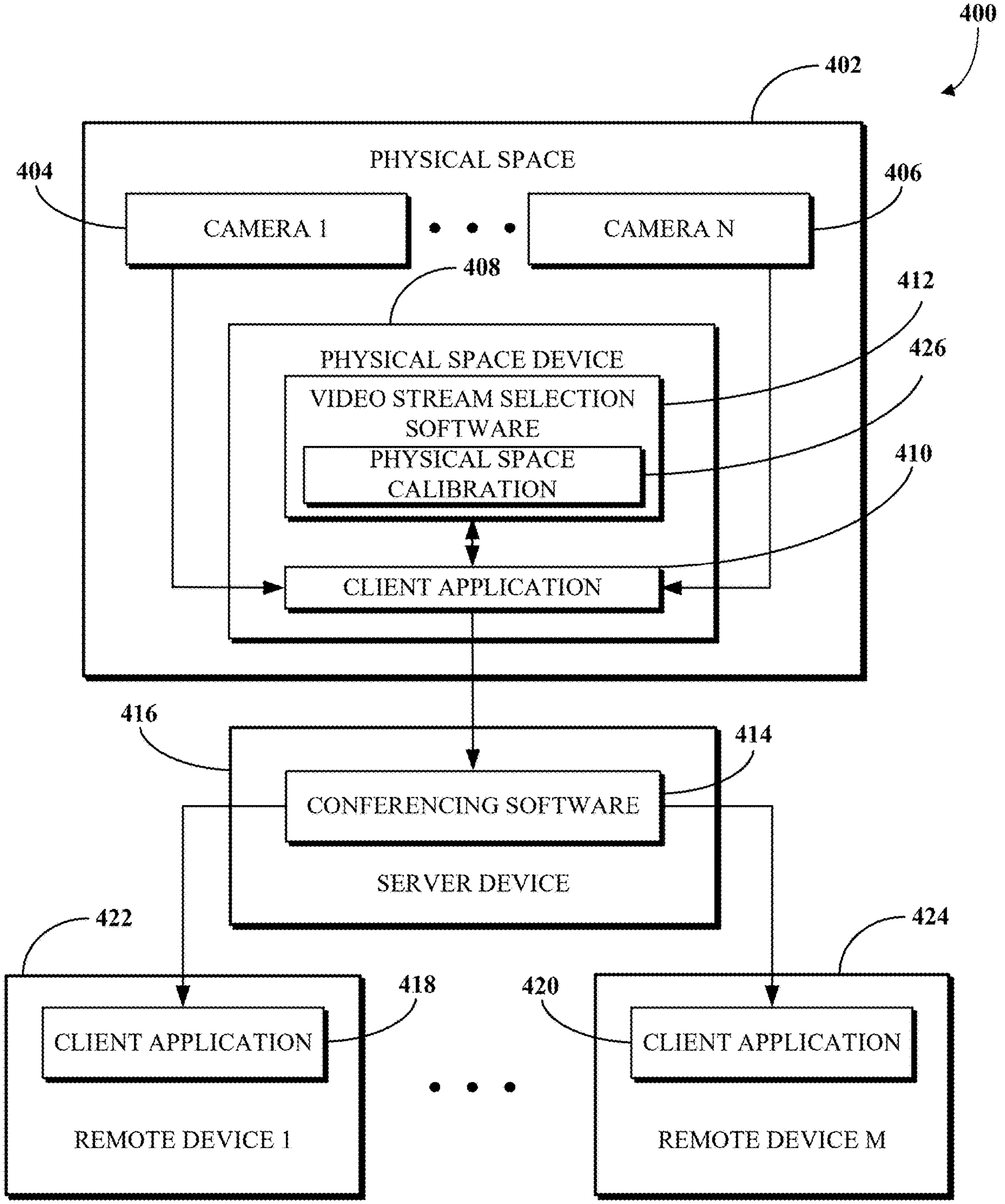
FIG. 4 is a block diagram of an example of a system for multi-camera video stream selection.

FIG. 4 is a block diagram of an example of a system 400 for multi-camera video stream selection. As shown, a physical space 402 includes multiple cameras from which video streams are obtained, including a camera 1 404 through a camera N 406, in which Nis an integer greater than or equal to 2. The physical space 402 is a place within which the multiple cameras and one or more people may be located, for example, a conference room, a shared office, or a private office. The cameras 1 404 through N 406 are configured to record video data within the physical space 402. For example, the camera 1 404 may be arranged on a first wall of the physical space 402 and the camera N 406 may be arranged on a second wall of the physical space 402 perpendicular to the first wall.

Each of the cameras 1 404 through N 406 has a field of view within the physical space 402 based on an angle and position thereof. Some or all of the cameras 1 404 through N 406 may be fixed such that their respective fields of view do not change. Alternatively, some or all of the cameras 1 404 through N 406 may have mechanical or electronic pan, tilt, and/or zoom functionality for narrowing, broadening, or changing the field of view thereof. For example, the pan, tilt, and/or zoom functionality of a camera may be electronically controlled, such as by a device operator or by a software intelligence aspect, such as a machine learning model or software which uses a machine learning model for field of view adjustment. A machine learning model as used herein may be or include one or more of a neural network (e.g., a convolutional neural network, recurrent neural network, or other neural network), decision tree, vector machine, Bayesian network, genetic algorithm, deep learning system separate from a neural network, or other machine learning model.

The cameras 1 404 through N 406 are connected, using one or more wired and/or wireless connections, to a physical space device 408 located within or otherwise associated with the physical space 402. The physical space device 408 is a computing device which runs software including a client application 410 and video stream selection software 412. For example, the physical space device 408 may be a client such as one of the clients 304 through 310 shown in FIG. 3. The client application 410 connects the physical space device 408 to a conference implemented by conferencing software 414 running at a server 416 device, which may, for example, be the server device 108 shown in FIG. 1. For example, the conferencing software 414 may be the conferencing software 314 shown in FIG. 3. The conference is a video-enabled conference with two or more participants in which one or more of those participants are in the physical space 402 and one or more of those participants are remote participants located external to the physical space 402.

The video stream selection software 412 includes software for determining a highest score video stream for a given conference participant within the physical space 402 from amongst video streams obtained from the cameras 1 404 through N 406 and for indicating that highest score video stream to the client application 410 running at the physical space device 408. The client application 410 uses that indication to output the highest score video stream for rendering within a user interface tile of the conferencing software 414, such as within the physical space device 408 and client applications 418 through 420 running at remote devices 1 422 through M 424, in which M is an integer greater than or equal to 2. In particular, and as such, the highest score video streams determined for participants within the physical space 402 are rendered within separate user interface tiles of a user interface of the conferencing software 414 at one or more devices connected to the conference, such as the physical space device 408 and the remote devices 1 422 through M 424.

The video stream selection software 412 determines a highest score video stream for a given conference participant by processing video streams obtained from one or more of the cameras 1 404 through N 406 which have fields of view that include the given conference participant. A score is determined for each such video stream, and those scores are compared to determine the highest score video stream from amongst those video streams. The score for a video stream is determined based on representations of the conference participant within the video stream. An example list of the factors evaluated to determine a score includes, without limitation, a percentage of a face of the conference participant which is visible within the video stream, a direction of the face of the conference participant relative to the camera from which the video stream is obtained, and/or a degree to which the face of the conference participant is obscured within the video stream. In some cases, the scores can be determined using a machine learning model trained to evaluate video streams according to one or more such factors. In some implementations, a factor of the one or more factors may correspond other than to a conference participant. For example, a factor used to determine a score for a video stream may correspond to a resolution or frame rate at which the video stream is captured or to a resolution or frame rate capability of the camera that captured the video stream.

The video stream selection software 412 may include a physical space calibration tool 426. The physical space calibration tool 426 includes software for calibrating a physical space 402 for video stream selection. In one configuration, physical space calibration is only performed once, prior to a video conference, to assist the video stream selection software 412 in differentiating between multiple conference participants. For example, if multiple conference participants within the physical space 402 have similar facial structures, similar clothing styles and colors, similar hair styles, or other similarities, the video stream selection software 412 may have difficulty differentiating between those conference participants and may accidentally select a video stream portraying a first conference participant for use as the selected video stream for a second conference participant. The physical space calibration tool 426 can calibrate the video stream selection software 412 for a physical space 402 using epipolar geometry to assist the video stream selection software 412 in differentiating between each conference participant within the physical space 402 for the purpose of selecting which video stream to use for each conference participant.

The client applications 418 through 420 are software which communicate with the conferencing software 414 to enable the users of the remote devices 1 422 through M 424 to participate in the conference implemented using the conferencing software 414 as a remote conference participant. Each of the remote devices 1 422 through M 424 is a computing device and may, for example, be one of the clients 304 through 310 shown in FIG. 3. At least some of the remote devices 1 422 through M 424 include one or more capture components, such as a camera, which capture input (e.g., video data) that is then transmitted to the conferencing software 414 for rendering within a user interface tile of a user interface of the conferencing software 414. For example, an input video stream from the remote device 1 422 may be processed and output within a user interface tile associated with the user of the remote device 1 422 within the user interface of the conferencing software 414 and an input video stream from the remote device M 424 may be processed and output within a user interface tile associated with the user of the remote device M 424 within the user interface of the conferencing software 414.

A region of interest generally refers to an area (e.g., a generally rectangular space) within which a conference participant is visible within a video stream obtained from a camera of the cameras 1 404 through N 406. The client application 410 determines regions of interest associated with the conference participants within the physical space 402 based on the video streams obtained from the cameras 1 404 through N 406. For example, data obtained from a camera of the cameras 1 404 through N 406 in connection with a video stream obtained from that camera can indicate the one or more regions of interest within the video stream. In such a case, the camera may perform region of interest processing to detect the regions of interest. In another example, the client application 410 or other software at the physical space device 408 can determine the regions of interest within the video stream obtained from a camera of the cameras 1 404 through N 406 without an indication of those regions of interest from the camera. In some implementations, as will be described below, a region of interest may refer to an area within which an object other than a conference participant is visible within a video stream obtained from a camera of the cameras 1 404 through N 406.

Regardless of where it is determined, a region of interest within the physical space 402 can be determined in one or more ways. In one example, a region of interest can be determined by processing a video stream captured by a camera of the cameras 1 404 through N 406 to detect a number of people, as conference participants, within the field of view of the camera. A machine learning model trained for object detection, facial recognition, or other segmentation can process the video data of the input video stream to identify humans. For example, the machine learning model can draw bounding boxes around objects detected as having human faces, in which those objects are recognized as the conference participants and remaining video data is representative of background content. The regions of interest determined from the video stream from the camera may then be rendered within separate user interface tiles of the user interface of the conferencing software 414.

In some implementations, the client application 410 can include the video stream selection software 412. In some implementations, the video stream selection software 412 may be implemented at the server 416 instead of at the physical space device 408. In such a case, the client application 410 may transmit some or all of the video streams obtained from the cameras 1 404 through N 406 to the server 416, and the selection of a video stream for some or all of the conference participants within the physical space 402 may as such be performed at the server 416 instead of at the physical space device 408.

In some implementations, one or more of the devices connected to the conferencing software 414 can connect to the conferencing software 414 other than by using a client application, such as the client applications 410 and 418 through 420. For example, the physical space device 408 and/or one or more of the remote devices 1 422 through M 424 may connect to the conference using a web application running through a web browser. In another example, the physical space device 408 and/or one or more of the remote devices 1 422 through M 424 may connect to the conference using a software application other than a web browser or a client application, for example, a non-client desktop or mobile application.

Figure 5:
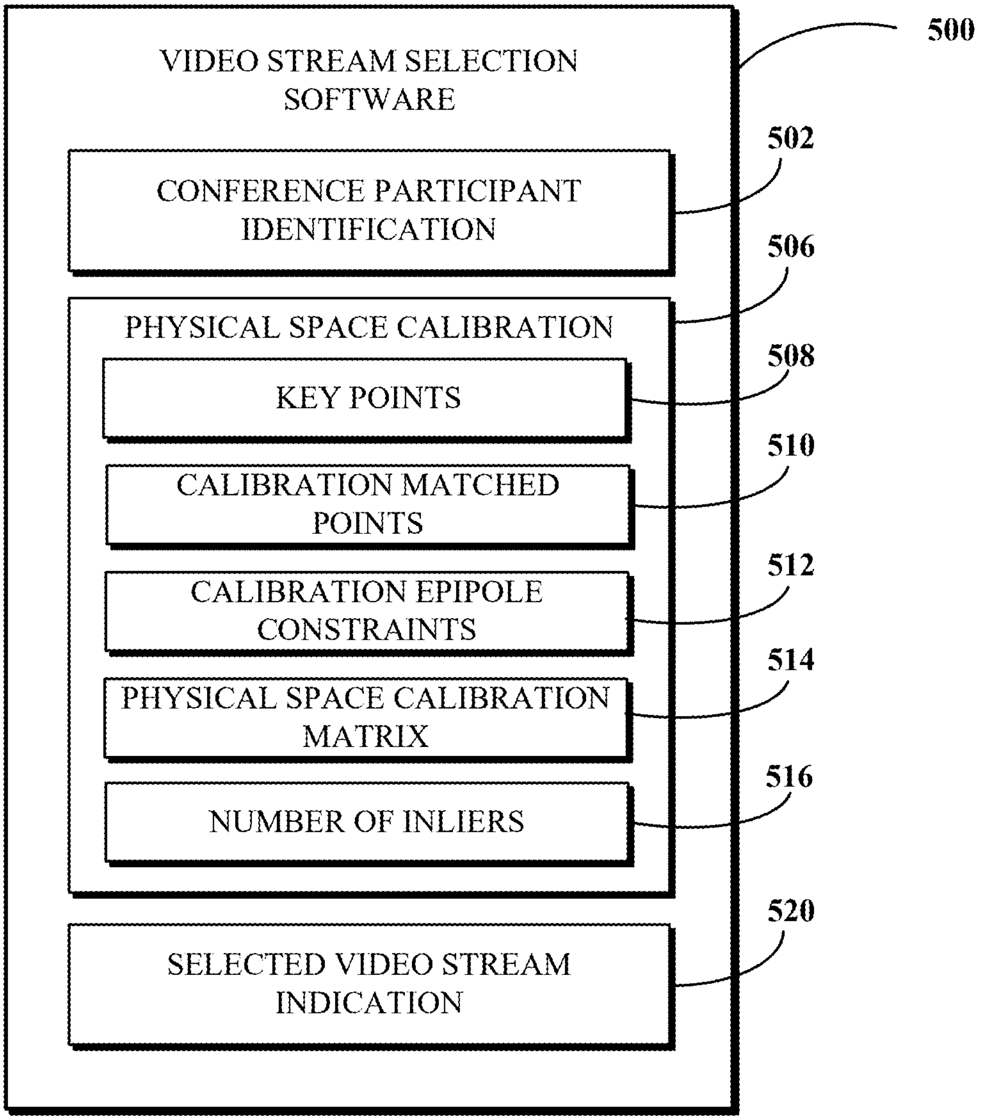
FIG. 5 is a block diagram of example functionality of video stream selection software.

FIG. 5 is a block diagram of example functionality of video stream selection software 500, which may, for example, be the video stream selection software 412 shown in FIG. 4. The video stream selection software 500 includes tools, such as programs, subprograms, functions, routines, subroutines, operations, and/or the like for selecting a video stream for each conference participant within a physical space 402 (e.g., a conference room) from amongst multiple video streams obtained from multiple cameras within the physical space 402. As shown, the video stream selection software 500 includes a conference participant identification tool 502, a selected video stream indication tool 520, and a physical space calibration tool 506.

The conference participant identification tool 502 identifies video streams which include representations of given conference participants. The conference participant identification tool 502 may use data from the physical space calibration tool 506 to uniquely identify each conference participant within a physical space 402. For example, the conference participant identification tool 502 may use a physical space calibration matrix 514 provided by the physical space calibration tool 506 to uniquely identify (i.e., differentiate) each conference participant within a physical space 402.

The physical space calibration tool 506 initiates a physical space calibration and maintains calibration data associated with the physical space calibration. During calibration, the physical space calibration tool 506 generates key points 508 for a person assisting with calibration. Each key point 508 may identify a portion of the person assisting within the view of a camera for a single frame. Each key point has a semantic meaning (e.g., nose, left shoulder, right hand) and includes a coordinate (x,y) and a confidence score s (where $0<=s<=1$). Thus, a key point is represented as $KP=\{(x,y),s\}$. Multiple key points 508 may be identified for a person assisting with physical space calibration.

The confidence score s for each key point 508 represents the relative confidence that the key point 508 is on the associated semantic meaning part of the person assisting with calibration in the frame (e.g., that the key point is on the person's left shoulder). When the person assisting with calibration is facing away from the camera, the confidence score s for some key points 508 (such as the nose or the left hand) may be low (less than 0.7). Likewise, when the person assisting with calibration is facing towards the camera, the confidence score s for some key points 508 may be high (greater than or equal to 0.7).

During calibration, the physical space calibration tool 506 may maintain multiple calibration matched points 510. The calibration matched points 510 are collected for each pair of cameras (such as the left camera and the right camera). For each frame, the physical space calibration tool 506 may generate key points 508 for each of the pair of cameras associated with a person assisting with calibration in the physical space. The key points 508 with the same semantic meaning and high confidence scores (e.g., greater than or equal to 0.7) may be identified as a pair of calibration matched points 510.

As an example, a key point 508 from the left camera for a nose of the person assisting with calibration is generated with a score of 0.8 and a key point 508 from the left camera for a left shoulder of the person assisting with calibration is generated with a score of 0.7. Likewise, a key point 508 from the right camera for the nose of the person assisting with calibration is generated with a score of 0.9 and a key point 508 from the right camera for the left shoulder of the person assisting with calibration is generated with a score of 0.4. Since both the key points for the nose are greater than 0.7, a calibration matched point 510 is collected for the nose as $MP=\{(x_L, y_L, s_L), (x_R, y_R, s_R)\}$, where $x_L$ and $y_L$ are the coordinates for the key point 508 corresponding to the nose captured by the left camera and $x_R$ and $y_R$ are the coordinates for the key point 508 corresponding to the nose captured by the right camera. Because the key point 508 from the right camera for the left shoulder of the person assisting with calibration is less than 0.7 (or some other threshold), the key point 508 from the right camera for the left shoulder of the person assisting with calibration and the key point 508 from the left camera for the left shoulder of the person assisting with calibration are not selected as calibration matched points 510.

Once the person assisting with calibration has finished moving around the physical space, all the calibration matched points 510 collected will be defined as a calibration matched points 510 set $MPS_{LR}=\{MP_1=\{(x_{1L}, y_{1L}, s_{1L}), (x_{1R}, y_{1R}, s_{1R})\}\ MP_2=(x_{2L}, y_{2L}, s_{2L}), (x_{2R}, y_{2R}, s_{2R})\}$. For a physical space with 3 cameras, the calibration matched points 510 set will be collected for each pair of cameras (left and right, left and main, right and main) as $MPS_{ML}$, $MPS_{MR}$, and $MPS_{LR}$ The physical space calibration tool 506 may use the calibration matched points 510 to solve a physical space calibration matrix 514 with epipolar geometry. Using epipolar geometry, geometric relationships between 3D points captured by two (or more) cameras for a physical space 402 can be obtained. These geometric relationships can then be projected onto 2D images captured by the cameras.

A calibration matched points 510 set with N matched points can be defined as $MPS=\{MP_1=\{(x_L, y_L, s_L), (x_R, y_R, s_R)\}, MP_2, \ldots, MP_N\}$. For each, 7 matched points are randomly selected from the MPS and are used to calculate a candidate physical space calibration matrix 514. The rest (N-7) of the matched points from the MPS are used to calculate the inliers number. Multiple loops may be performed to obtain multiple candidate physical space calibration matrices 514. For example, 10,000 loops may be performed to obtain 10,000 candidate physical space calibration matrices 514.

A candidate physical space calibration matrix 514, which can be written as F, is a 3×3 matrix with 9 parameters but it has 2 intrinsic constraints, so only 7 equations are needed to solve such a matrix. By randomly selecting 7 matched points $\{\{(x_{1L}, y_{1L}), (x_{1R}, y_{1R})\}, \{(x_{2L}, y_{2L}), x_{2R}, y_{2R})\}, \ldots, \{(x_{7L}, y_{7L}), (x_{7R}, y_{7R})\}\}$, the 7 equations can be constructed to solve the candidate physical space calibration matrix 514 as $P_{iL}\cdot F\cdot P_{iR}=0$ using matrix multiplication, where $P_{iL}$ is the (x,y) coordinates of a calibration matched point 510 captured by the left camera and $P_{iR}$ is the (x,y) coordinates of a corresponding calibration matched point 510 captured by the right camera. With the 7 equations (one for each of the 7 random calibration matched points 510 selected), a candidate physical space calibration matrix 514 can be calculated. Using multiple loops, each with a different random selection of 7 calibration matched points 510, multiple candidate physical space calibration matrices 514 may be obtained.

For a physical space with 3 cameras (main, left, right), three candidate physical space calibration matrices 514 are calculated: $F_{ML}$ between the main and the left cameras, $F_{MR}$ between the main and the right cameras, and $F_{LR}$ between the left and right cameras.

The physical space calibration matrix 514 has two interesting properties. First, for any point in the left view $X_L=(x_L, y_L)$, $S_R=F_{LR}\cdot X_L$ is the corresponding epiline in the right view. $S_R=(a,b,c)$ denotes a line a*x+b*y+c=0. If a right-view point $X_R=(x_R, y_R)$ locates into the epiline, then $S_R\cdot X_R=0$. Second, different points in the left view $X_{L1}$, $X_{L2}$, $X_{L3}$ . . . will generate different epilines $S_{R1}$, $S_{R2}$, $S_{R3}$ . . . in the right view. All of these epilines will intersect at one point, which is referred to as an epipole $e_R=(x_e, y_e, 1)$. This allows the physical space calibration matrix 514 to be used during a video conference to verify whether a conference participant identified from a first camera is the same as a conference participant identified from a second camera.

The epipole constraints 512 are that one camera can not be seen by the view of another camera. So, the epipole should be located outside of the image plane. Thus, for each loop, after calculating the candidate physical space calibration matrix 514, the corresponding epipoles are calculated. If those epipoles ($e_L$ and $e_R$) are located inside the image plane, then the candidate physical space calibration matrix 514 is rejected and the process moves to the next loop.

Once the loops have completed (each loop resulting in a candidate physical space calibration matrix 514) and the matrices are filtered by the calibration epipole constraints 512, the optimal physical space calibration matrix 514 of the candidate physical space calibration matrices 514 is selected. The candidate physical space calibration matrix 514 with the highest inlier number is selected as the optimal physical space calibration matrix 514.

For each candidate physical space calibration matrix 514, the number of inliers 516 is calculated. For each pair of calibration matched points 510 $\{P_L=(x_L, y_L), P_R=(x_R, y_R)\}$ of the set of calibration matched points 510 not used to solve the candidate physical space calibration matrix 514, the epilines are calculated as $S_R=(a_R, b_R, c_R)$ and $S_L=(a_L, b_L, c_L)$ using the candidate physical space calibration matrix 514. Then, the distance between the calibration matched point 510 and the epiline is calculated as $d_L=\text{dist}(P_L, S_L)$ and $d_R=\text{dist}(P_R, S_R)$. If both $d_l$ and $d_R$ are smaller than a distance threshold, then the pair of calibration matched points 510 $\{P_L=(x_L, y_L), P_R=(x_R, y_R)\}$ is counted as an inlier for the corresponding candidate physical space calibration matrix 514. If either $d_L$ or $d_R$ are greater than the distance threshold, then the pair of calibration matched points 510 $\{P_L=(x_L, y_L), P_R=(x_R, y_R)\}$ is counted as an outlier for the corresponding candidate physical space calibration matrix 514. The candidate physical space calibration matrix 514 with the largest number of inliers 516 is selected as the optimal physical space calibration matrix 514.

During a video conference, the video stream selection software 500 may use the optimal physical space calibration matrix 514 to determine whether a conference participant identified by a first camera is the same person as a conference participant identified by a second camera.

In some implementations, the conference participant identification tool 502 may identify video streams which include a given conference participant based on processing performed in connection with regions of interest within those video streams to identify the conference participant.

In some such implementations, regions of interest may be determined within one or more of the video streams for more than one conference participant. For example, rather than separate each individual conference participant within the physical space 402 into his or her own user interface tile, in some cases, two or more of those conference participants can share a user interface tile.

The object detection and/or object recognition processing described with respect to the conference participant identification tool 502 can be performed on a discrete time interval basis (e.g., once every ten seconds or once every minute) or on an event basis (e.g., in response to determining that something about the representation of the subject conference participant within one or more of the video streams has changed, such as where the conference participant changes the direction they are facing, gets up from their seat, moves around the physical space, or begins talking after a period of them not talking). For example, the conference participant identification tool 502 can process one out of every ten frames of each of the video streams obtained from the cameras within the physical space 402 to perform object detection and object recognition. In some implementations, the performance of object detection and/or object recognition may be limited by compute resources available for such performance, such as processing and graphical resources used for one or more machine learning models trained to perform the object detection and/or object recognition. Video data associated with the video streams identified by the conference participant identification tool 502 for a given conference participant may be processed to determine scores for those video streams and to select a video stream for the given conference participant based on those scores.

A score for a video stream may be based on a representation of a subject conference participant within that video stream. The representation of a subject conference participant within a given video stream generally refers to perceptible visual qualities associated with the conference participant within that video stream. In particular, the perceptible visual qualities may relate to a face of the subject conference participant and the degree to which some or all of the face is visually perceptible within the given video stream. It is possible that the same video streams can be given different scores for different conference participants.

The score assigned to a video stream indicates how well a video stream represents a conference participant based on one or more factors, including, without limitation, a percentage of the face of the conference participant which is visible within the video stream, a direction of the face of the conference participant relative to the camera from which the video stream is obtained, and/or a degree to which the face of the conference participant is obscured within the video stream. The factors, and thus the scores themselves, are intended to determine the video stream which will provide the best quality visual representation of the given conference participant at some point in time during a video conference. In some cases, a model is used to weight various ones of the factors according to their relative importance. For example, a first weight may be applied to the percentage of the face of the conference participant which is visible within the video stream to indicate that it is a most important factor, and a second, lower weight may be applied to the direction of the face of the conference participant relative to the camera. In some cases, the model may be a machine learning model. Using physical space calibration to identify participants within the physical space ensures that accurate scores (e.g., scores for the same person across multiple cameras) are compared (rather than comparing a score for a first video stream of a first participant with a score for a second video stream of a second participant).

The use of multiple factors for determining a score for a video stream may often be important given the potential variance in conference attendance and physical space layout. For example, depending on how full the physical space 402 is, there may be obstructions that partially block the view of a conference participant from a video stream during one video conference that are not there during another video conference in the same physical space 402. As such, a video stream from a first camera that shows 100 percent of a face of a given conference participant will likely have a highest score of all video streams identified for the given conference participant. However, if at some point during the video conference an object (e.g., another conference participant or an inanimate object placed on a surface, such as a conference room table) partially obscures the face of the given conference participant from that first camera, a video stream of a second camera that shows a lower (e.g., 75) percent of the face of the given conference participant without obstruction may be updated to have the highest score, even if the percentage of the face of the conference participant that is still visible to the first camera remains above that lower percent.

As described above, one or more of the factors used to determine the score for a video stream may correspond to a resolution or frame rate at which the video stream is captured or to a resolution or frame rate capability of the camera that captured the video stream. In particular, in some cases, all of the cameras in the physical space 402 may be configured to capture video streams at the same resolution and/or frame rate, such as due to the cameras in the physical space 402 being the same camera model manufactured by the same company. However, in other cases, one or more of the cameras in the physical space 402 may be configured to capture a video stream at a resolution and/or frame rate which differs from the resolution and/or frame rate at which the other cameras in the physical space 402 are configured to capture video streams. In some implementations, where two video streams have the same scores based on factors corresponding to a conference participant (e.g., percentage of their face which is visible and direction of their face relative to the camera), but one is captured at a higher resolution and/or frame rate than the other, the score for the video stream which is captured at the higher resolution and/or frame rate may be higher than the score for the other video stream.

It is possible for the same video stream to be the highest scored video stream for multiple conference participants. Similarly, it is possible for a given video stream to be the lowest scored video stream for any conference participant. In many cases, different video streams will be highest scored video streams for different conference participants based on the conference participants and the cameras from which the video streams are obtained being located around the physical space 402 rather than all within a single area thereof.

In some implementations, where a region of interest is determined to correspond to a group of conference participants (e.g., as in the audience example described above), scores may be determined for each video stream which includes that group of conference participants. In some such implementations, the score determined for such a video stream may be based on a sum or average of scores determined for each individual conference participant of the group of conference participants. For example, separate scores can be determined for each conference participant within each of the subject video streams. The total score or average score for each of the video streams may then be compared to select the video stream for that group of conference participants.

The selected video stream indication tool 520 indicates the video stream with the highest score to cause the video stream to be output for rendering within a user interface tile associated with the given conference participant. The selected video stream indication tool 520 may also indicate a bounding box around the given conference participant within the selected video stream. The bounding box may define the portion of the selected video stream that will be shown in the user interface tile for that participant in the video conference. The bounding box may be selected to center around the participant or the bounding box may be selected to minimize other participants within the field of view of the bounding box. Furthermore, the bounding box may zoom in/zoom out on the selected participant and adjust the frame rate or resolution of the selected video stream accordingly.

Although the tools 502 through 506 and 520 are shown as functionality of the video stream selection software 500 as a single piece of software, in some implementations, some or all of the tools 502 through 506 and 520 may exist outside of the video stream selection software 500 and/or the software platform may exclude the video stream selection software 500 while still including the some or all of tools 502 through 506 and 520 in some form elsewhere. For example, some or all of the tools 502 through 506 and 520 may be implemented by a client application such as the client application 410 shown in FIG. 4.

Figure 6:
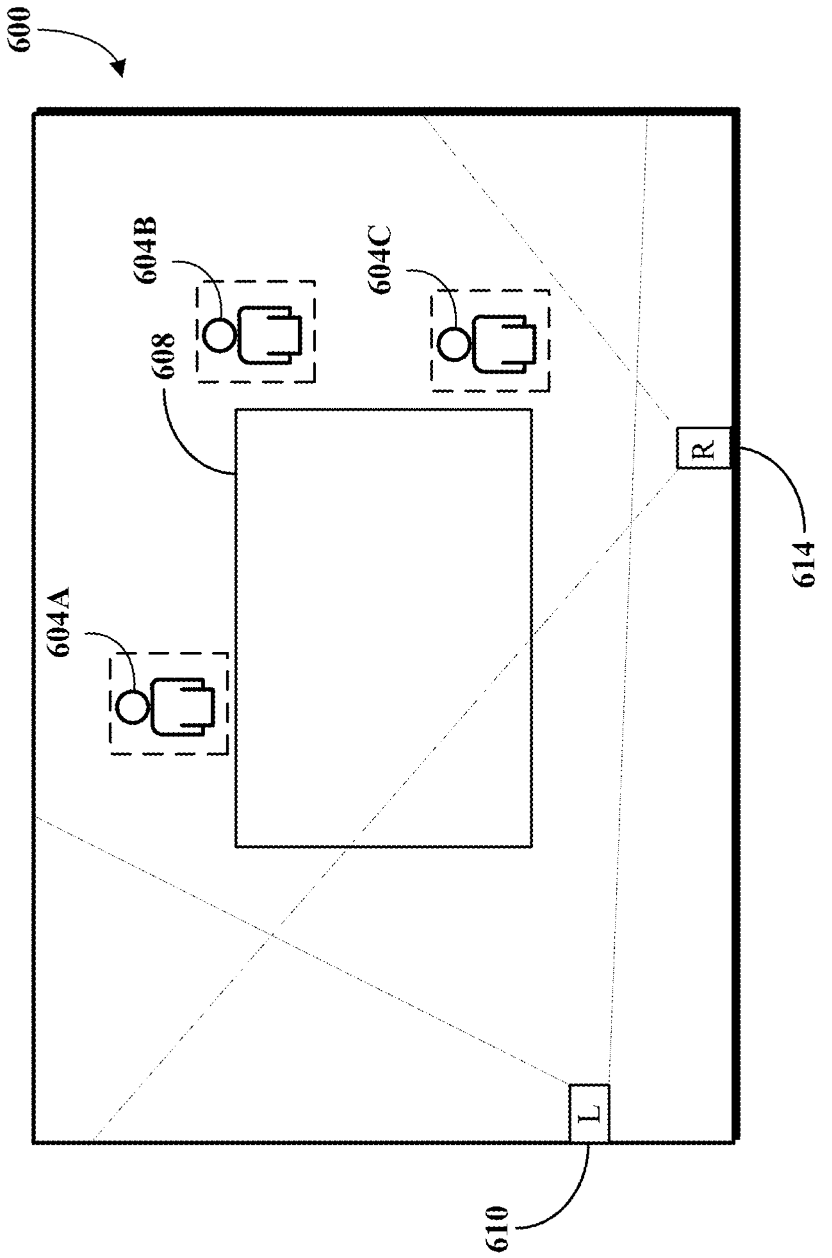
FIG. 6 is an illustration of an example of a physical space within which physical space calibration is performed.

FIG. 6 is an illustration of an example of a physical space 600, which in this example is a conference room, within which physical space calibration may be performed. The physical space 600 may be one example of the physical space 402 of FIG. 4. A person 604 who is assisting with calibrating the physical space 600 is shown at three different locations (and thus at three different times) around a conference room table 608 during the calibration. Cameras 610 and 614, which may, for example, be the cameras 1 404 through N 406 shown in FIG. 4, are located within the physical space 600. In particular, the camera 610, which is labeled as camera L (i.e., left), is arranged on a first wall of the physical space 600 and the camera 614, which is respectively labeled as camera R (i.e., right), is arranged on a second wall of the physical space 600 perpendicular to the first wall. Each of the cameras 610 and 614 has a field of view, which, as shown, are partially overlapping. In particular, the person 604 assisting with physical calibration is within the field of view of both cameras at all three locations/times shown (i.e., 604A-C). While the example as shown and described involves calibration at three locations/times, other numbers of calibration locations/times may be used.

During the physical space calibration, the person 604 assisting with physical space calibration may be instructed to move around the physical space 600. For example, the person 604 assisting with physical space calibration may walk around the conference room table 608. This allows each of the cameras to capture multiple key points 508 for the person 604 as they move across the paths of both cameras. The person 604 assisting with physical space calibration may be instructed to move across all places where conference participants are likely to be during a video conference. For example, if there are chairs along three edges of the conference room table 608, the person 604 assisting with physical calibration may be instructed to walk along those three edges to ensure enough key points 508 are collected. As another example, the person 604 may not be expected to walk to locations in the physical space 600 that are not within the field of view of both cameras. If the person 604 has not moved through enough of the physical space 600 to allow the cameras to collect enough key points 508, the software platform may instruct the person 604 to continue moving. In one configuration, the software platform may instruct the person 604 to move through specific areas of the physical space 600 where key points 508 have not been collected.

Figure 7:
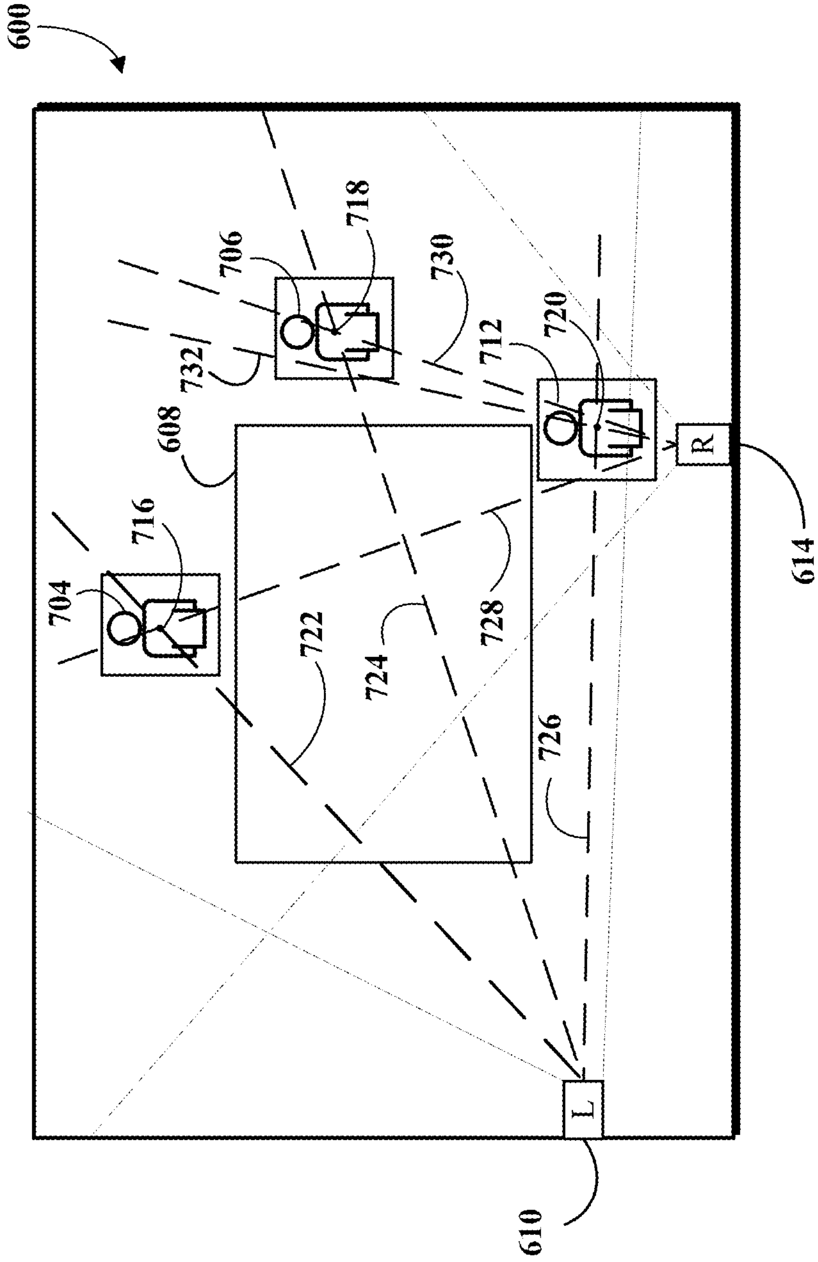
FIG. 7 is an illustration of an example of a physical space within which physical space calibration is used during a video conference.

FIG. 7 is an illustration of a physical space 600, which in this example is a conference room, within which physical space calibration may be used during a video conference. The physical space 600 of FIG. 7 is the same physical space 600 that was calibrated using physical space calibration in FIG. 6. As long as the cameras 610, 614 have not been moved, the physical space calibration may continue to be used for video conferences indefinitely. As shown in the physical space 600, the left camera 610, the right camera 614, and the conference room table 608 are all in the same spots as they were during the physical space calibration.

Using the physical space calibration matrix 514 obtained during the physical space calibration, epilines from the center of focus of each camera are obtained that pass through the centers of bounding boxes corresponding to each conference participant. Thus, for a first conference participant 704 with a first center 716 of a first bounding box, a first epiline 722 from the left camera 610 and a second epiline 728 from the right camera 614 are shown passing through or near the first center 716 at a first epipoint. Likewise, for a second conference participant 706 with a second center 718 of a bounding box, a third epiline 724 from the left camera 610 and a fourth epiline 730 from the right camera 614 are shown passing through or near the center 718 at a second epipoint. For a third conference participant 712 with a third center 720 of a bounding box, a fifth epiline 726 from the left camera 610 and a sixth epiline 732 from the right camera 614 are shown passing through or near the center 720 at a third epipoint.

When a physical space 600 has three cameras (as described below in relation to FIG. 8), the physical space calibration tool 506 can project an epiline corresponding to a first identified person from the left camera and an epiline corresponding to a second identified person from the right camera onto an image captured by the center camera. If the epilines cross near the same bounding box (or region of interest), then the physical space calibration tool 506 can identify them as the same person. If the intersection of the two epilines is not located in a bounding box, the physical space calibration tool 506 is only able to determine that the first identified person and the second identified person are possibly different people.

Figure 8:
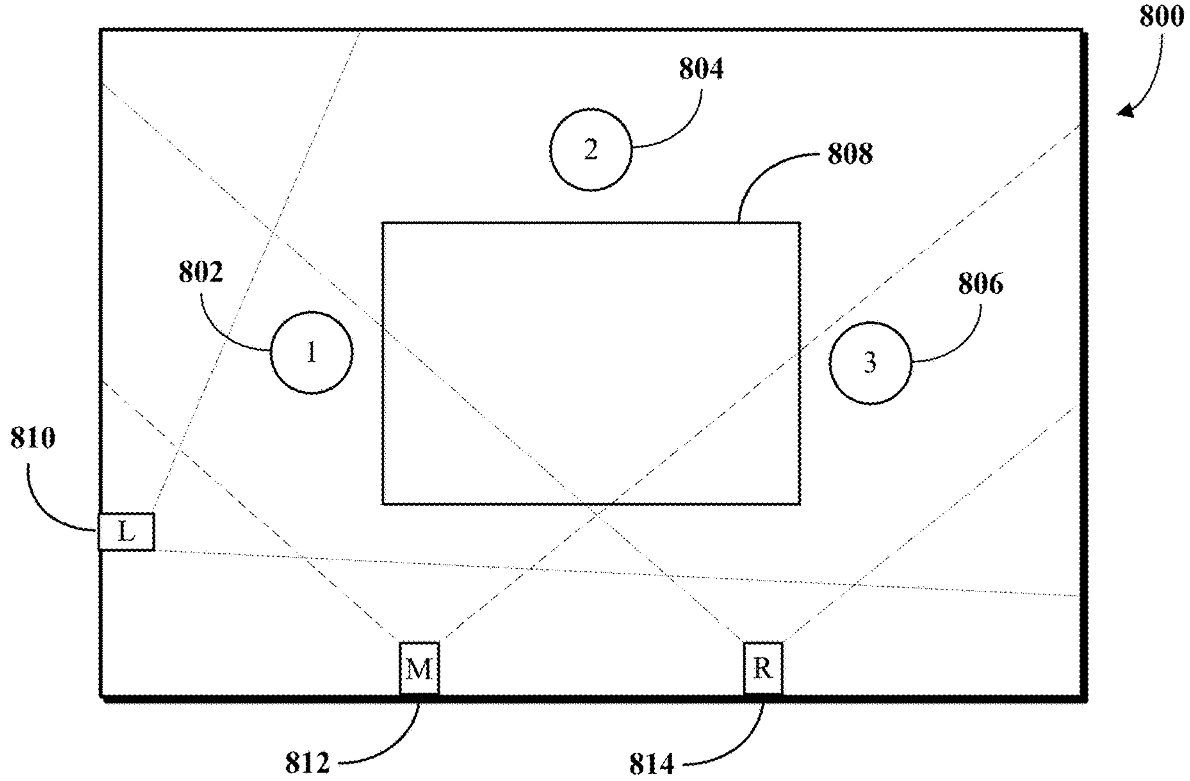
FIG. 8 is an illustration of an example of a physical space within which conference participants are located during a video conference.

FIG. 8 is an illustration of an example of a physical space 800, which in this example is a conference room, within which conference participants 802, 804, and 806 are located. The physical space 800 may, for example, be the physical space 402 shown in FIG. 4. The conference participants 802, 804, and 806, who are respectively labeled as conference participants 1, 2, and 3, are seated around a conference table 808. Cameras 810, 812, and 814, which may, for example, be the cameras 1 404 through N 406 shown in FIG. 4, are located within the physical space 800. In particular, the camera 810, which is labeled as camera L (i.e., left), is arranged on a first wall of the physical space 800 and the cameras 812 and 814, which are respectively labeled as cameras M and R (i.e., main and right), are each arranged on a second wall of the physical space 800 perpendicular to the first wall. Each of the cameras 810, 812, and 814 has a field of view, which, as shown, are partially overlapping. In particular, all three of the conference participants 802, 804, and 806 are within the field of view of the camera 810, only the conference participants 802 and 804 are within the field of view of the camera 812, and only the conference participants 804 and 806 are within the field of view of the camera 814.

A highest score video stream determined from amongst video streams obtained from the cameras 810, 812, and 814 is used to represent the conference participants 802, 804, and 806 within user interface tiles of conferencing software (e.g., the conferencing software 414 shown in FIG. 4). A physical space calibration tool 506 has been used to calculate a physical space calibration matrix 514 for the physical space 800, allowing the video stream selection software 500 to uniquely identify/authenticate each of the conference participants 802, 805, and 806. The video stream selection software 500 determines which video stream to use as the highest score video stream for rendering within a user interface tile associated with a given conference participant 802, 804, or 806 based on representations of that conference participant within the video streams obtained from the cameras 810, 812, and 814.

In some cases, a video stream from a camera may not include a conference participant. For example, the field of view of the camera 812 does not include the conference participant 806, and so the video stream from the camera 812 does not represent the conference participant 806 and thus will not be determined as the highest scoring video stream for the conference participant 806. Similarly, the field of view of the camera 814 does not include the conference participant 802, and so the video stream from the camera 814 will not be determined as the highest scoring video stream for conference participant 802.

In other cases, a video stream from a camera 810, 812, or 814 may include a conference participant but not from a desirable angle or distance. For example, as shown, the conference participants 802 and 806 are included within the field of view of the camera 810. However, a video stream from the camera 810 should not be used for a user interface tile of the conference participant 802, and a video stream from a different camera may be better for a user interface tile of the conference participant 806. Regarding the conference participant 802, the conference participant 802 is facing away from the camera 810, and video of the back of the head of the conference participant 802 is not useful. A score for the video stream of the camera 810 will likely be low for the conference participant 802. As such, and because the conference participant 802 is not included in the field of view of the camera 814, the video stream from the camera 812 will likely be used for the conference participant 802.

Regarding the conference participant 806, who is included in the fields of view of the cameras 810 and 814, scores will be determined for video streams from both of those cameras. The camera 810 is directly facing the conference participant 806 when the conference participant 806 is facing forward, and so in some cases the score for the video stream from the camera 810 is likely to be the highest. However, in some cases, such as if the conference participant 806 were to rotate toward the camera 814 (e.g., if a new conference participant enters the physical space 800), the video stream from the camera 814 may have a highest score given the proximity of the conference participant 806.

As has been discussed, a video stream from a single camera can be processed to produce separate video streams to be output for rendering within separate user interface tiles for multiple conference participants. For example, a video stream from the camera 812 can be processed to determine a region of interest associated with the conference participant 802 and a region of interest associated with the conference participant 804. Video streams available for rendering within separate user interface tiles associated with the conference participants 802 and 804 may then be obtained for each of those regions of interest from the camera 812. In another example, a video stream from the camera 814 can be processed to determine a region of interest associated with the conference participant 804 and a region of interest associated with the conference participant 806. Video streams available for rendering within separate user interface tiles associated with the conference participants 804 and 806 may then be obtained for each of those regions of interest from the camera 814. Generally, each conference participant 802, 804, and 806 is represented within the user interface of the conferencing software using a single, separate user interface tile, so in the examples described above, one, but not both, of a video stream from the camera 812 or a video stream the camera 814 would be used for the conference participant 804.

FIG. 9 is an illustration of a user interface 900 of conferencing software, for example, the conferencing software 414 shown in FIG. 4, within which video streams determined for conference participants in a physical space (e.g., the physical space 402) that has been through physical space calibration are rendered within user interface tiles. As shown, the user interface 900 is in an active speaker layout. The user interface tiles include multiple user interface tiles 902 arranged in a gallery view and a large user interface tile 904 representing an active speaker at a given time during a conference. In this active speaker layout, the active speaker whose user interface tile is shown at 904 may switch based on the conversation of the conference. At least some of the user interface tiles 902 represent conference participants within a physical space, for example, the physical space 800 shown in FIG. 8. For example, the highest score video stream determined for the conference participant 802 shown in FIG. 8, the highest score video stream determined for the conference participant 804 shown in FIG. 8, and the highest score video stream determined for the conference participant 806 shown in FIG. 8 may be rendered within separates ones of the user interface tiles 902.

Figure 10:
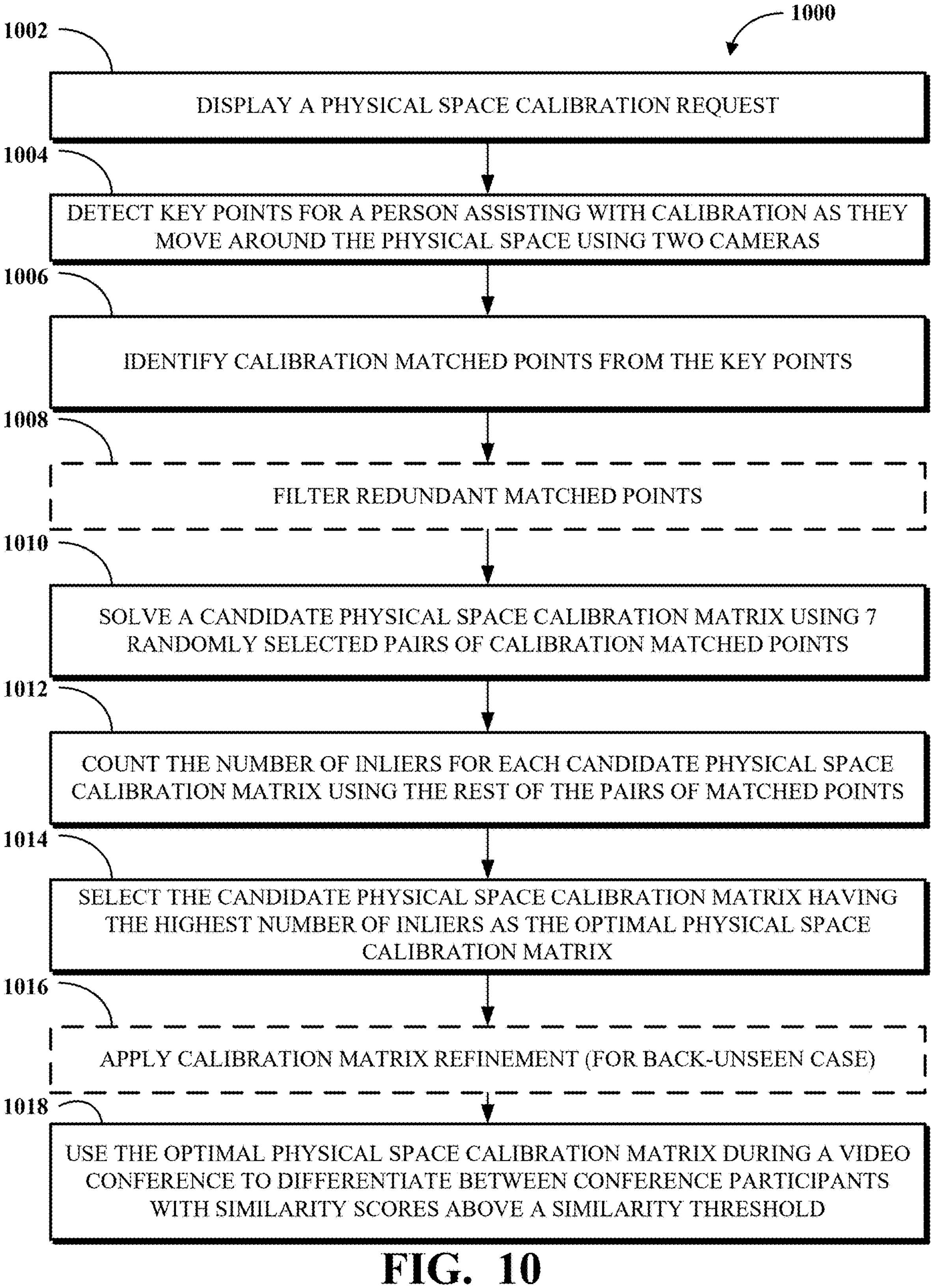
FIG. 10 is a flowchart of an example of a technique for calibrating a physical space for video conferencing.
Figure 11:
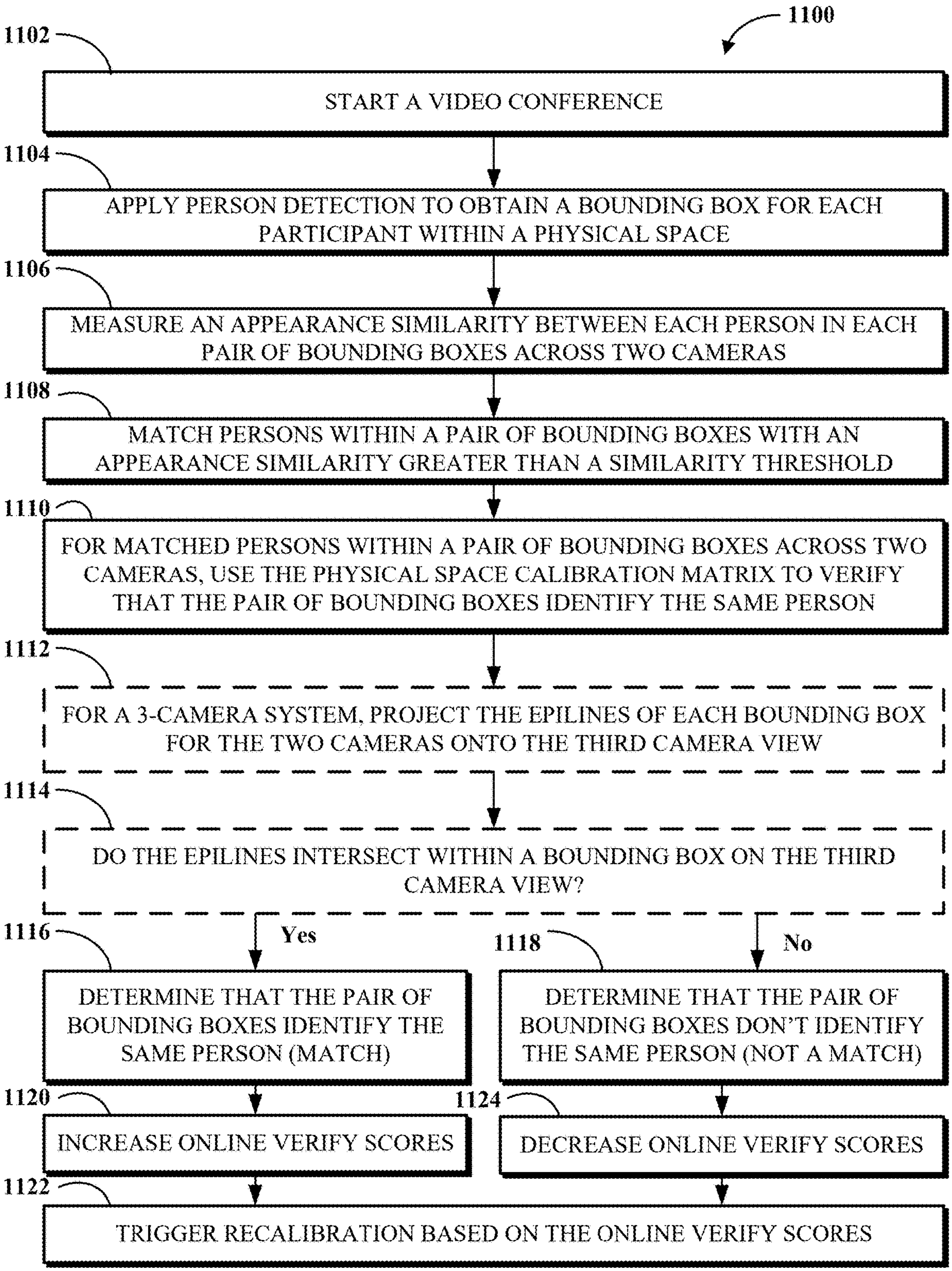
FIG. 11 is a flowchart of an example of a technique for applying a physical calibration matrix during a video conference.

To further describe some implementations in greater detail, reference is next made to examples of techniques which may be performed by or using a system for calibration of a physical space. FIG. 10 is a flowchart of an example of a technique 1000 for calibrating a physical space for video conferencing. FIG. 11 is a flowchart of an example of a technique 1100 for using physical space calibration during a video conference with multi-camera video stream selection.

The technique 1000 and/or the technique 1100 can be executed using computing devices, such as the systems, hardware, and software described with respect to FIGS. 1-9. The technique 1000 and/or the technique 1100 can be performed, for example, by executing a machine-readable program or other computer-executable instructions, such as routines, instructions, programs, or other code. The steps, or operations, of the technique 1000 and/or the technique 1100 or another technique, method, process, or algorithm described in connection with the implementations disclosed herein can be implemented directly in hardware, firmware, software executed by hardware, circuitry, or a combination thereof.

For simplicity of explanation, the technique 1000 and the technique 1100 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 10, the technique 1000 for calibrating a physical space (e.g., the physical space 402) for video conferencing is shown. The physical space may be a conference room in which multiple conference participants are located during a video conference implemented using conferencing software. Alternatively, the physical space may be an office used by a single person. As a further alternative, the physical space may be a lecture hall or other large space configured for seating an audience.

At step 1002, a physical space calibration request is displayed. The physical space calibration request may be displayed on a screen in the physical space 402 or the physical space calibration request may be displayed in an email sent to an administrator of the physical space 402. In one configuration, the physical space calibration request may be sent in a message to a host of a next upcoming video conference in the physical space 402 requesting that they arrive early for calibration of the physical space 402.

The physical space calibration request may inform a person 604 assisting with calibration of the steps needed for calibrating the physical space 402. For example, the physical space calibration request may inform the person 604 assisting with calibration that the physical space 402 needs to be cleared of other persons, the person 604 assisting needs to stand (or sit) at the farthest left portion of the physical space 402 nearest to the left camera 610, and that once the calibration begins the person 604 assisting needs to move at a reasonable pace around the physical space 402 and stop at the farthest right portion of the physical space 402 nearest to the right camera 614. The physical space calibration request may inform the person 604 assisting with calibration that they should slow down or speed up their movement speed or that the person 604 assisting should face towards the cameras while moving. In one configuration, the physical space calibration request may inform the person 604 assisting with calibration that they need to move through the physical space 402 again to collect more calibration matched points 510. In another configuration, the physical space calibration request may inform the person 604 assisting with calibration that they need to move through the physical space 402 again because more than one person was detected moving through the physical space 402 during the calibration.

At step 1004, key points 508 are detected for the person 604 assisting with calibration. The key points 508 may be detected by the left camera 610, the right camera 614, or both cameras. The key points 508 may be detected using human pose estimation and be located on the face, head, chest, or arms of the person 604 assisting with calibration.

At step 1006, calibration matched points 510 are identified for the key points 508. As discussed above, the key points 508 from two cameras that have the same semantic meaning and high confidence scores (greater than or equal to 0.7) may be identified as a pair of calibration matched points 510. If the person 604 assisting with calibration does not move across parts of the physical space where conference participants are expected to be present in a future video conference, the physical space calibration may fail (and future physical space calibration requests may include instructions for moving through particular parts of the physical space to the physical space 402 is properly calibrated).

At optional step 1008, redundant calibration matched points 510 are filtered. In one configuration, the calibration matched points 510 may be filtered using non-maximum suppression (NMS) for each pair of cameras' redundant calibration matched points 510 set, which removes redundant calibration matched points 510 from the matched point sets. Other filtering methods may also be used.

At step 1010, a candidate physical space calibration matrix 514 for two cameras is solved using 7 randomly selected pairs of calibration matched points 510 captured by those two cameras.

At step 1012, the number of inliers 516 is counted for each candidate physical space calibration matrix. As discussed above, the number of inliers 516 is counted using the pairs of calibration matched points 510 that were not used to solve the candidate physical space calibration matrix 514. The system may loop steps 1010 and 1012 10,000 times. If no candidate physical space calibration matrices 514 are obtained after 10,000 loops of steps 1010 and 1012, the person assisting with calibration will need to move around the physical space again for recalibration.

At step 1014, the candidate physical space calibration matrix 514 having the highest number of inliers 516 is selected as the optimal physical space calibration matrix. If multiple candidate physical space calibration matrices 514 have the same number of inliers 516, one may randomly be selected as the optimal physical space calibration matrix 514.

At optional step 1016, calibration matrix refinement may be applied. Calibration matrix refinement may be applied for back-unseen cases. In some scenarios, many of the key points 508 generated for the person assisting with calibration may be below the confidence score of 0.7 (and may instead be between a low threshold of 0.5 and a high threshold of 0.7) because the person assisting with calibration has their back facing to the camera too often. Thus, the number of calibration matched points 510 may be below a minimum threshold. When this happens, calibration matched points 510 with key points 508 having confidence scores greater than or equal to 0.5 may be placed in a low-threshold matched points set, which is a large dataset with lower accuracy. Calibration matched points 510 with key points 508 having confidence scores greater than or equal to 0.7 may be placed in a high-threshold matched points set, which is a smaller dataset with higher accuracy. A low-threshold matched points set may be collected as $MPS_{low}=\{MP_1=\{(x_{1L}, y_{1L}, s_{1L}), (x_{1R}, y_{1R}, s_{1R})\}, MP_2, \ldots, MP_N|(s_{iL}+s_{iR})/2>=0.5\}$. A high-threshold matched points set may be extracted from the set of low-threshold matched points as $MPS_{high}=\{MP_i \in MPS_{low}|(s_{iL}+s_{iR})/2>=0.7\}$.

The physical space calibration matrix 514 $F_{high}$ may be calculated for the high-threshold matched points set $MPS_{high}$. The physical space calibration matrix 514 $F_{high}$ can fit high-threshold matched points well but not low-threshold matched points because there are less accurate matched points in the full collaboration matched points 510 set MPS. The physical space calibration matrix 514 $F_{high}$ can be used to find all the inliers of $MPS_{low}$, which can construct a reliable matched points set $MPS_{reliable}=\{MP_i \in MPS|MP_i$. The reliable matched points set $MPS_{reliable}$ can then be used to obtain a refined calibration matrix $F_{reliable}$. The refined calibration matrix $F_{reliable}$ can be used as the optimal physical space calibration matrix 514 when there aren't enough (or any) candidate physical space calibration matrices 514.

At step 1018, the optimal physical space calibration matrix 514 may be used during a video conference to differentiate between conference participants with similarity scores above a similarity threshold.

The video streams that include a particular conference participant may then be scored to determine which of the available video streams should be selected for rendering within separate user interface tiles of conferencing software. In one configuration, the video stream with a highest score that includes a specific conference participant may be selected for use in the user interface tile of conferencing software for that conference participant.

Referring next to FIG. 11, the technique 1100 for applying the physical space calibration matrix 514 during a video conference is shown. At 1102, a video conference is started in a physical space 402 that has gone through physical space calibration. Thus, there exists an optimal physical space calibration matrix 514 for the physical space 402 where the video conference is being held.

At step 1104, person detection is applied for each camera's view of the physical space. In a physical space used for a video conference with multiple people and 2 cameras, each of the cameras simultaneously captures the same physical space from different views. Likewise, in a physical space used for a video conference with multiple people (and with 3 cameras), each of the 3 cameras simultaneously capture the same physical space from different views. The person detection returns a bounding box for each person detected in the room for each camera view. Each bounding box $B_{iM}$ consists of points $P_{iM}=(x_{iM}, y_{iM}, x'_{iM}, y'_{iM})$ and a score $S_{iM}$, where $x_{iM}$, $y_{iM}$ is the left-top coordinates and $x'_{iM}$, $y'_{iM}$ is the right-down coordinates.

At step 1106, an appearance similarity between each person in each pair of the bounding boxes is measured. For example, if there are two cameras and each camera identifies 5 bounding boxes, the appearance similarity will be measured for all 5 bounding boxes of the first camera against each of the 5 bounding boxes of the second camera and the appearance similarity will be measured for all 5 bounding boxes of the second camera against each of the 5 bounding boxes of the first camera (i.e., the appearance similarity is measured once for each pair of bounding boxes across the two cameras). The appearance similarity may be measured using ReID. ReID is a function (implemented using a deep learning model) used to measure how similar the appearances are (e.g., clothing, hairstyle) between two people. The ReID function can be applied to two bounding boxes (across two different cameras) to obtain a ReID score $S_{reid}(i_{C1}, j_{C2})=ReID(B_{iC1}, B_{jC1})$, where $C_1, C_2 \in \{M, L, R\}$ denote the camera and i,j denote the person index. A high ReID score means the pair of bounding boxes are likely to be the same person and a low ReID score means the pair of bounding boxes are likely to be two different people. If $C_1=C_2$, the ReID score $S_{reid}=0$ because two bounding boxes from the same camera can not identify the same person.

At step 1108, persons within a pair of bounding boxes with an appearance similarity greater than a similarity threshold may be matched. The system may loop all pairs (i.e., bounding boxes across two or three different cameras) based on ReID score in descending order. For each ReID pair $(B_{iC1}, B_{jC2})$, if the appearance similarity (e.g., the ReID score) is larger than the similarity threshold and if $B_{iC1}$ and $B_{jC2}$ are unmatched (i.e., not yet matched to the bounding box of a conference participant from a different camera), then $B_{iC1}$ and $B_{jC2}$ are matched as the same person.

At step 1110, the physical space calibration matrix 514 may be used to verify that the matched people across two bounding boxes identify the same person for a 2-camera physical space. Calibration constraints may be applied to filter invalid pairs of calibration matched points 510 (i.e., not likely identifying the same person) during the ReID matching algorithm. For a ReID matching pair ($B_{iL}$, $B_{jR}$), the bounding boxes are $B_{iL}=x_{iL}, y_{iL}, x'_{iL}, y'_{iL}$ and $B_{jR}=x_{iR}, y_{iR}, x'_{iR}, y'_{iR}$, respectively. The center of each bounding box is $P_R=((x_{iR}+x'_{iR})/2, (y_{iR}+y'_{iR})/2)$, which is the length by half of the rectangle diagonal $Len_R=\text{sqrt}(((x'_{iR}-x_{iR})^2+(y'_{iR}-y_{iR})^2)/2$. Using the 3×3 physical space calibration matrix 514 $F_{LR}$, the corresponding epiline for $P_R$ of the other view is $S_L=F_{LR}\cdot P_R$, where $S_L=(a,b,c)$. The distance disz between $S_L$ and $P_L$ is then calculated. Ideally, if the person in the bounding box $B_{iC1}$ is the same as the person in the bounding box $B_{jC2}$, $dis_L$ should be 0 (i.e., $P_L\cdot S_L=P_L\cdot F_{LR}\cdot P_R=0$). In practice, the epiline $S_L$ may not perfectly cross point $P_L$. This is resolved by stipulating that if $dis_L<=Len_L$, then $B_{iL}$ and $B_{jR}$ are matched (and represent the same person). If $dis_L>Len_L$, they are unmatched and filtered out.

At optional step 1112 (for a 3-camera physical space), the epilines of each bounding box for two of the cameras are projected onto the third camera view. The main camera can be used to determine whether two boxes in the left/right cameras are the same person. For a bounding box from the left camera with a center point $P_L$ and a bounding box from the right camera with a center point $P_R$, the corresponding epilines in the main camera are calculated by $S_{ML}=F_{ML}\cdot P_L$ and $S_{MR}=F_{MR}\cdot P_R$.

At optional step 1114 (for a 3-camera physical space), it is determined whether the calculated epilines intersect within a bounding box on the third camera view. If $P_L$ and $P_R$ correspond to the same person, then this person should exist in the region of the intersection point between $S_{ML}$ and $S_{MR}$, so the intersection point should correspond to a bounding box identifying a person. If the intersection point is located in a bounding box, then the two bounding boxes ($P_L$ and $P_R$) are a match and may represent the same person. If the intersection point is not located in a bounding box, then $P_L$ and $P_R$ do not match as the same person and the corresponding matched pair can be filtered out.

At step 1116, it is determined that the pair of bounding boxes identify the same person (using either the 2-camera method discussed above in relation to step 1110 or the 3-camera method discussed in relation to step 1112 and step 1114). At step 1120, online verify scores are increased. At step 1122, recalibration of the physical space 402 is triggered based on the online verify scores.

At step 1118, it is determined that the pair of bounding boxes do not identify the same person (using either the 2-camera method discussed above in relation to step 1110 or the 3-camera method discussed above in relation to step 1112 and step 1114). At step 1124, the online verify scores are decreased. At step 1122, recalibration of the physical space 420 is triggered based on the online verify scores.

If it is determined that one of the cameras has been physically moved, the calibration constraints may be turned off for the duration of the video conference and recalibration may be triggered before a next video conference in the physical space 402. Likewise, if it is determined that the physical space calibration matrix 514 is inaccurate, the calibration constraints may be discontinued/turned off until recalibration can occur.

To verify whether the physical space calibration matrix 514 is accurate, an online verify strategy may be employed using two online verify scores: a verification score Sv and a verification count Cv. The verification score Sv (0<=Sv<=100) is initiated at 0 and the verification count Cv is initiated at 0. The physical space calibration matrix 514 may be inaccurate when a high-Reid pair of calibration matched points 510 does not indicate a single person (i.e., when the high-Reid pair (ReID score of greater than or equal to 0.7) of calibration matched points 510 indicates two people, one from each camera). Each time a high-Reid pair of calibration matched points 510 fails to indicate a single person, the verification score and the verification count are decreased. Likewise, each time a high-Reid pair of calibration matched points successfully indicates a single person, the verification score and the verification count are increased. If the verification score is below a score threshold (e.g., 60) corresponding to the physical space calibration matrix 514 at the end of a video conference, then recalibration of the physical space 402 may be triggered.

For a current time step, if all the high-ReID pairs of calibration matched points 510 pass the online verify test, the verification score Sv may be increased to the minimum of Sv+3 and 100, and the verification count Cv may be increased to the minimum of Cv+1 and 5. If some of the high-ReID pairs of calibration matched points 510 do not pass the online verify test (i.e., a pair of ReID calibration matched points 510 with a score above 0.7 do not indicate the same person using the physical space calibration matrix 514, then the verification score Sv may be decreased to the maximum of Sv−1 and 0, and the verification count Cv may be decreased to the maximum of Cv−1 and 0. If the verification count Cv reaches 0 during a video conference (after the use of the physical space calibration matrix 514), then the calibration constraints should be turned off and recalibration of the physical space 402 is triggered before the next video conference using the physical space 402. If the verification score Sv is lower than 60 at the end of the video conference, recalibration of the physical space 402 is triggered before the next video conference using the physical space 402.

A recalibration trigger may include sending a notice to an administrator of the physical space 402 that indicates recalibration is needed, such as in a chat or email. Alternatively, the recalibration trigger may send a notice to a next host of a video conference using the physical space 402 that recalibration is needed and suggest that the host arrive to the physical space 402 a few minutes early to assist with the recalibration.

The implementations of this disclosure correspond to methods, non-transitory computer readable media, apparatuses, systems, devices, and the like.

The disclosure presented herein may be considered in view of the following clauses.

Example Clause A: A method, comprising: identifying matched points using a first camera and a second camera as a person moves within a physical space; and using, during a video conference, a physical space calibration matrix solved based on the matched points to determine whether a first bounding box of a first person captured by the first camera and a second bounding box of a second person captured by the second camera identify a single conference participant within the physical space.

Example Clause B: The method of Example Clause A, the method comprising: filtering the matched points using non-maximum suppression (NMS) to remove redundant matched points.

Example Clause C: The method of Example Clause A, wherein each of the matched points are key points from the first camera and the second camera for the person that have a same semantic meaning and confidence scores above a threshold.

Example Clause D: The method of any of Example Clauses A-C, wherein the matched points are also identified using a third camera, wherein each of the matched points are key points between two cameras for the person that have a same semantic meaning and confidence scores above a threshold, wherein a first set of matched points are key points between the first camera and the second camera, wherein a second set of matched points are key points between the first camera and the third camera, wherein a third set of matched points are key points between the second camera and the third camera, and wherein the first set of matched points are used to solve a first physical space calibration matrix, the second set of matched points are used to solve a second physical space calibration matrix, and the third set of matched points are used to solve a third physical space calibration matrix.

Example Clause E: The method of any of Example Clauses A-D, wherein the physical space calibration matrix is solved by: solving multiple candidate physical space calibration matrices, each corresponding to a set of seven random pairs of the matched points; counting a number of inliers for each candidate physical space calibration matrix using the matched points not used for solving the candidate physical space calibration matrix; and setting the candidate physical space calibration matrix with a highest number of inliers as the physical space calibration matrix.

Example Clause F: The method of any of Example Clauses A-E, wherein counting the number of inliers for each candidate physical space calibration matrix comprises: calculating a first epiline and a second epiline, for a pair of matched points of the matched points not used for solving the candidate physical space calibration matrix, using the candidate physical space calibration matrix; calculate a distance between each epiline and the corresponding matched point of the pair of matched points; and count the pair of matched points as an inlier when the distance between each epiline and the corresponding matched point is smaller than a threshold.

Example Clause G: The method of any of Example Clauses A-F, comprising: determining that a number of matched points are below a high threshold; generating a set of low-threshold matched points using key points of the person that are below the high threshold and above a low threshold; generating a set of high-threshold matched points using key points of the person that are above the high threshold; calculating a first physical space calibration matrix using the high-threshold matched points; using the first physical space calibration matrix to obtain inliers of the low-threshold matched points; and solving a second physical space calibration matrix using the inliers, wherein the second physical space calibration matrix is set as the physical space calibration matrix.

Example Clause H: The method of any of Example Clauses A-G, wherein using the physical space calibration matrix comprises: determining that the first bounding box and the second bounding box have an appearance similarity score above a similarity threshold; obtaining a first epiline corresponding to a center of the first bounding box using the physical space calibration matrix; calculating a distance between a center of the second bounding box and the first epiline; and determining that the first person and the second person are matched if the distance is less than or equal to length by half of a rectangle diagonal of the second bounding box.

Example Clause I: The method of any of Example Clauses A-H, comprising: discontinuing use of calibration constraints during the video conference when a verification count is equal to or below a threshold, wherein the verification count is increased when the first person and the second person are determined to be matched, and wherein the verification count is decreased when the first person and the second person are not determined to be matched; and triggering recalibration of the physical space when the video conference is over.

Example Clause J: The method of any of Example Clauses A-J, comprising: triggering recalibration of the physical space if a verification score is greater than or equal to a threshold when the video conference is over, wherein the verification score is increased when the first person and the second person are determined to be matched, and wherein the verification score is decreased when the first person and the second person are not determined to be matched.

Example Clause K: The method of any of Example Clauses A-J, wherein the matched points are also identified using a third camera, and wherein using the physical space calibration matrix comprises: calculating a first epiline corresponding to a center of the first bounding box using the physical space calibration matrix; calculating a second epiline corresponding to a center of the second bounding box using the physical space calibration matrix; projecting the first epiline and the second epiline onto a view of the third camera; and determining that the first person and the second person are matched if the first epiline and the second epiline intersect within a bounding box of the view of the third camera.

Example Clause L: The method of any of Example Clauses A-K, wherein the first bounding box and the second bounding box are obtained using person detection, wherein the first bounding box and the second bounding box are matched if an appearance similarity between the first person and the second person is greater than a similarity threshold, and wherein the physical space calibration matrix is only used for matched bounding boxes.

Example Clause M: The method of any of Example Clauses A-L, comprising: displaying a physical space calibration request in the physical space that directs a person assisting with calibration to move around the physical space.

Example Clause N: The method of any of Example Clauses A-M, comprising: determining that the physical space calibration matrix needs recalibration; and sending a message to a host of an upcoming video conference in the physical space indicating that the physical space calibration matrix needs the recalibration.

Example Clause O: A non-transitory computer readable medium storing instructions operable to cause one or more processors to perform operations comprising: identifying matched points using a first camera and a second camera as a person moves within a physical space; and using, during a video conference, a physical space calibration matrix solved based on the matched points to determine whether a first bounding box of a first person captured by the first camera and a second bounding box of a second person captured by the second camera identify a single conference participant within the physical space.

Example Clause P: The non-transitory computer readable medium of Example Clause O, wherein each of the matched points are key points from the first camera and the second camera for the person that have a same semantic meaning and confidence scores above a threshold.

Example Clause Q: The non-transitory computer readable medium of Example Clause O or Example Clause P, wherein the physical space calibration matrix is solved by: solving multiple candidate physical space calibration matrices, each corresponding to a set of seven random pairs of the matched points; counting a number of inliers for each candidate physical space calibration matrix using the matched points not used for solving the candidate physical space calibration matrix; and setting the candidate physical space calibration matrix with a highest number of inliers as the physical space calibration matrix.

Example Clause R: An apparatus, comprising: a memory; and a processor configured to execute instructions stored in the memory to: identify matched points using a first camera and a second camera as a person moves within a physical space; and use, during a video conference, a physical space calibration matrix solved based on the matched points to determine whether a first bounding box of a first person captured by the first camera and a second bounding box of a second person captured by the second camera identify a single conference participant within the physical space.

Example Clause S: The apparatus of Example Clause R, wherein the matched points are also identified using a third camera, wherein each of the matched points are key points between two cameras for the person that have a same semantic meaning and confidence scores above a threshold, wherein a first set of matched points are key points between the first camera and the second camera, wherein a second set of matched points are key points between the first camera and the third camera, wherein a third set of matched points are key points between the second camera and the third camera, and wherein the first set of matched points are used to solve a first physical space calibration matrix, the second set of matched points are used to solve a second physical space calibration matrix, and the third set of matched points are used to solve a third physical space calibration matrix.

Example Clause T: The apparatus of Example Clause S, wherein the processor is configured to execute the instructions to: determine that a number of matched points are below a high threshold; generate a set of low-threshold matched points using key points of the person that are below the high threshold and above a low threshold; generate a set of high-threshold matched points using key points of the person that are above the high threshold; calculate a first physical space calibration matrix using the high-threshold matched points; use the first physical space calibration matrix to obtain inliers of the low-threshold matched points; and solve a second physical space calibration matrix using the inliers, wherein the second physical space calibration matrix is set as the physical space calibration matrix.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

identifying matched points using a first camera and a second camera as a person moves within a physical space;

solving multiple candidate physical space calibration matrices, each corresponding to a set of the matched points selected at random;

counting a number of inliers for each candidate physical space calibration matrix using the matched points not used for solving the candidate physical space calibration matrix;

selecting a physical space calibration matrix having a highest number of inliers from the multiple candidate physical space calibration matrices; and using, during a video conference, the physical space calibration matrix to determine whether a first bounding box of a first person captured by the first camera and a second bounding box of a second person captured by the second camera identify a single conference participant within the physical space.

2. The method of claim 1, the method comprising:

filtering the matched points using non-maximum suppression (NMS) to remove redundant matched points.

3. The method of claim 1, wherein each of the matched points are key points from the first camera and the second camera for the person that have a same semantic meaning and confidence scores above a threshold.

4. The method of claim 1, wherein the matched points are also identified using a third camera, wherein each of the matched points are key points between two cameras for the person that have a same semantic meaning and confidence scores above a threshold, wherein a first set of matched points are key points between the first camera and the second camera, wherein a second set of matched points are key points between the first camera and the third camera, wherein a third set of matched points are key points between the second camera and the third camera, and wherein the first set of matched points are used to solve a first physical space calibration matrix, the second set of matched points are used to solve a second physical space calibration matrix, and the third set of matched points are used to solve a third physical space calibration matrix.

5. The method of claim 1, wherein the matched points selected at random include seven pairs of matched points.

6. The method of claim 5, wherein counting the number of inliers for each candidate physical space calibration matrix comprises:

calculating a first epiline and a second epiline, for a pair of matched points of the matched points not used for solving the candidate physical space calibration matrix, using the candidate physical space calibration matrix;

calculating a distance between each epiline and the corresponding matched point of the pair of matched points; and counting the pair of matched points as an inlier when the distance between each epiline and the corresponding matched point is smaller than a threshold.

7. The method of claim 1, comprising:

determining that a number of matched points are below a high threshold;

generating a set of low-threshold matched points using key points of the person that are below the high threshold and above a low threshold;

generating a set of high-threshold matched points using key points of the person that are above the high threshold;

calculating a first physical space calibration matrix using the high-threshold matched points;

using the first physical space calibration matrix to obtain inliers of the low-threshold matched points; and solving a second physical space calibration matrix using the inliers, wherein the second physical space calibration matrix is set as the physical space calibration matrix.

8. The method of claim 1, wherein using the physical space calibration matrix comprises:

determining that the first bounding box and the second bounding box have an appearance similarity score above a similarity threshold;

obtaining a first epiline corresponding to a center of the first bounding box using the physical space calibration matrix;

calculating a distance between a center of the second bounding box and the first epiline; and determining that the first person and the second person are matched if the distance is less than or equal to length by half of a rectangle diagonal of the second bounding box.

9. The method of claim 8, comprising:

discontinuing use of calibration constraints during the video conference when a verification count is equal to or below a threshold, wherein the verification count is increased when the first person and the second person are determined to be matched, and wherein the verification count is decreased when the first person and the second person are not determined to be matched; and triggering recalibration of the physical space when the video conference is over.

10. The method of claim 8, comprising:

triggering recalibration of the physical space if a verification score is greater than or equal to a threshold when the video conference is over, wherein the verification score is increased when the first person and the second person are determined to be matched, and wherein the verification score is decreased when the first person and the second person are not determined to be matched.

11. The method of claim 1, wherein the matched points are also identified using a third camera, and wherein using the physical space calibration matrix comprises:

calculating a first epiline corresponding to a center of the first bounding box using the physical space calibration matrix;

calculating a second epiline corresponding to a center of the second bounding box using the physical space calibration matrix;

projecting the first epiline and the second epiline onto a view of the third camera; and determining that the first person and the second person are matched if the first epiline and the second epiline intersect within a bounding box of the view of the third camera.

12. The method of claim 1, wherein the first bounding box and the second bounding box are obtained using person detection, wherein the first bounding box and the second bounding box are matched if an appearance similarity between the first person and the second person is greater than a similarity threshold, and wherein the physical space calibration matrix is only used for matched bounding boxes.

13. The method of claim 1, comprising:

displaying a physical space calibration request in the physical space that directs a person assisting with calibration to move around the physical space.

14. The method of claim 1, comprising:

determining that the physical space calibration matrix needs recalibration; and sending a message to a host of an upcoming video conference in the physical space indicating that the physical space calibration matrix needs the recalibration.

15. A non-transitory computer readable medium storing instructions operable to cause one or more processors to perform operations comprising:

identifying matched points using a first camera and a second camera as a person moves within a physical space;

solving multiple candidate physical space calibration matrices, each corresponding to a set of the matched points selected at random;

counting a number of inliers for each candidate physical space calibration matrix using the matched points not used for solving the candidate physical space calibration matrix;

selecting a physical space calibration matrix having a highest number of inliers from the multiple candidate physical space calibration matrices; and using, during a video conference, the physical space calibration matrix to determine whether a first bounding box of a first person captured by the first camera and a second bounding box of a second person captured by the second camera identify a single conference participant within the physical space.

16. The non-transitory computer readable medium of claim 15, wherein each of the matched points are key points from the first camera and the second camera for the person that have a same semantic meaning and confidence scores above a threshold.

17. The non-transitory computer readable medium of claim 15, wherein the matched points selected at random include seven pairs of matched points.

18. An apparatus, comprising:

a memory; and a processor configured to execute instructions stored in the memory to:

identify matched points using a first camera and a second camera as a person moves within a physical space;

solve multiple candidate physical space calibration matrices, each corresponding to a set of the matched points selected at random;

count a number of inliers for each candidate physical space calibration matrix using the matched points not used for solving the candidate physical space calibration matrix;

select a physical space calibration matrix having a highest number of inliers from the multiple candidate physical space calibration matrices; and use, during a video conference, the physical space calibration matrix to determine whether a first bounding box of a first person captured by the first camera and a second bounding box of a second person captured by the second camera identify a single conference participant within the physical space.

19. The apparatus of claim 18, wherein the matched points are also identified using a third camera, wherein each of the matched points are key points between two cameras for the person that have a same semantic meaning and confidence scores above a threshold, wherein a first set of matched points are key points between the first camera and the second camera, wherein a second set of matched points are key points between the first camera and the third camera, wherein a third set of matched points are key points between the second camera and the third camera, and wherein the first set of matched points are used to solve a first physical space calibration matrix, the second set of matched points are used to solve a second physical space calibration matrix, and the third set of matched points are used to solve a third physical space calibration matrix.

20. The apparatus of claim 18, wherein the processor is configured to execute the instructions to:

determine that a number of matched points are below a high threshold;

generate a set of low-threshold matched points using key points of the person that are below the high threshold and above a low threshold;

generate a set of high-threshold matched points using key points of the person that are above the high threshold;

calculate a first physical space calibration matrix using the high-threshold matched points;

use the first physical space calibration matrix to obtain inliers of the low-threshold matched points; and solve a second physical space calibration matrix using the inliers, wherein the second physical space calibration matrix is set as the physical space calibration matrix.

* * * * *